United States Patent [19]

Ishikawa et al.

[11] Patent Number: 4,763,156
[45] Date of Patent: Aug. 9, 1988

[54] CAMERA WITH A BARRIER

[75] Inventors: Norio Ishikawa; Toshihiko Ishimura, both of Osaka; Nobuyuki Taniguchi, Nishinomiya; Yasuaki Akada, Osaka; Reiji Seki, Sakai, all of Japan

[73] Assignee: Minolta Camera Kabushiki Kaisha, Osaka, Japan

[21] Appl. No.: 19,792

[22] Filed: Feb. 27, 1987

[30] Foreign Application Priority Data

Feb. 28, 1986 [JP] Japan ................... 61-45770
Feb. 28, 1986 [JP] Japan ................... 61-45772
Mar. 10, 1986 [JP] Japan ................... 61-53063

[51] Int. Cl.⁴ .......................... G03B 7/08; G03B 7/26; G03B 17/00; G03B 17/18
[52] U.S. Cl. ............................. 354/442; 354/475; 354/484; 354/486; 354/289.1
[58] Field of Search .................. 354/412, 441–445, 354/465, 471, 473, 474, 475, 149.11, 289.1, 289.12, 288, 187, 268, 486

[56] References Cited

U.S. PATENT DOCUMENTS

| | | | |
|---|---|---|---|
| 4,103,307 | 7/1978 | Shinoda et al. | 354/412 |
| 4,114,173 | 9/1978 | Tezuka et al. | 354/268 X |
| 4,320,944 | 3/1982 | Nakai | 354/422 |
| 4,329,034 | 5/1982 | Murakami et al. | 354/443 |
| 4,352,548 | 10/1982 | Toyoda | 354/443 X |
| 4,457,604 | 7/1984 | Tsuboi | 354/289.12 X |
| 4,470,684 | 9/1984 | Harvey | 354/149.11 X |
| 4,483,601 | 11/1984 | Sekida et al. | 354/288 |
| 4,525,054 | 6/1985 | Someya et al. | 354/443 |
| 4,529,291 | 7/1985 | Mizogui | 354/443 |
| 4,536,074 | 8/1985 | Someya et al. | 354/442 |
| 4,557,574 | 12/1985 | Kohno et al. | 354/288 |
| 4,595,268 | 6/1986 | Tsuboi | 354/202 X |

FOREIGN PATENT DOCUMENTS 59-105620 6/1984 Japan .
59-105625 6/1984 Japan .

Primary Examiner—W. B. Perkey
Attorney, Agent, or Firm—Burns, Doane, Swecker & Mathis

[57] ABSTRACT

A camera with a barrier wherein a photograph with proper exposure can be produced without taking anything into consideration so far as the barrier is closed and change-over of an operation mode of the camera can be effected automatically in response to a position or a motion of the barrier. The barrier is mounted for movement between an open position in which an operable member operable for reflecting intention of a photographer on exposure is exposed to allow operation of the operable member and a closed position in which the barrier covers the operable member. When the barrier is in the open position, an exposure controlling mode in which intention of a photographer is reflected on exposure can be selected, but when the barrier is in the closed position, the intention of the photographer is prevented from being reflected on exposure. The barrier has a further position at which a controlling circuit for the camera exposure is held inoperative, and when the barrier is moved between adjacent ones of the positions, the controlling circuit is rendered operative.

13 Claims, 25 Drawing Sheets

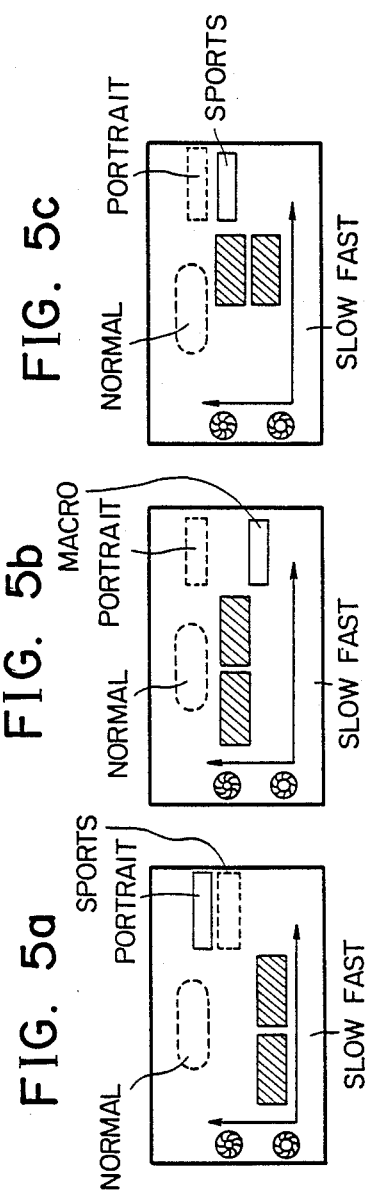
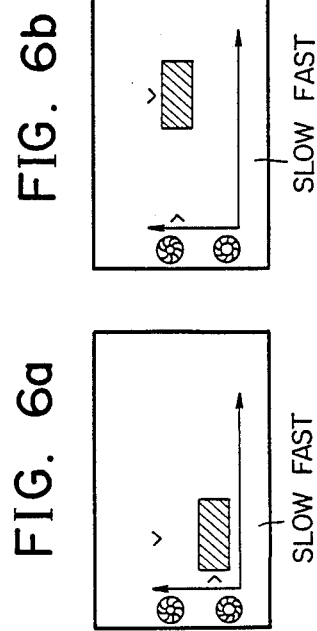

CAMERA WITH A BARRIER

BACKGROUND OF THE INVENTION

1. Field of the Invention

This invention relates to a camera with a barrier, and more particularly to a camera with a barrier wherein an exposure controlling mode is automatically changed over in response to an opening or closing motion of the barrier which is provided to cover an operating member for exposure operation when there is no necessity of operation of the operating member.

2. Description of the Prior Art

Recent cameras include a built-in controlling circuit and have operation keys for inputting data to the controlling circuit. Cameras have been already proposed wherein such operation keys are arranged depending upon the frequency in use and an openable and closable cover is provided to cover those operation keys which are not used very frequently. A typical one of such cameras is disclosed, for example, in Japanese Patent laid-open No. 58-136019. However, the prior art arrangement is not constituted such that a controlling mode of an exposure controlling circuit of a camera is changed over in response to an opening or closing motion of the cover.

Meanwhile, cameras having a lens cover which is actuated to open and close a camera lens are on the market, and a camera has been proposed wherein operation thereof is enabled when such a lens cover is opened but when the lens cover is closed, operation of the camera is disabled. However, the proposed camera does not allow change-over of a controlling mode of an exposure controlling circuit of the camera in response to an opening or closing motion of the lens cover.

It is troublesome for a photographer to take various matters into consideration over exposure in preparation for photographing. Accordingly, it is convenient to photograph with programmed exposure which is normally equipped as a standard for a camera. However, in some cases, it may become necessary to photograph with an effect of at least either one of a shutter speed and an aperture value taken into consideration.

Accordingly, a single-lens reflex camera is constituted to allow change-over among programmed exposure in which there is no necessity of taking anything into consideration over exposure, and an A mode (aperture priority exposure), an S mode (shutter speed priority exposure) and an M mode (manual exposure) in which intention of a photographer can be reflected on exposure. By the way, change-over members for such change-over operation are exposed outside a camera. Accordingly, if the camera is used to photograph with those change-over members operated inadvertently, photographing will be conducted in any other mode than the programmed exposure. Consequently, the exposure time may become too long, resulting in failure of a photograph due to a shake of the camera, or the aperture value may be improper, resulting in failure of a photograph wherein the depth of field is either too deep or too shallow or wherein exposure is not proper. Thus, it is a problem that an unexpectedly failed photograph may be produced. Further, in case of a beginner photographer, it is another problem that an intended photograph may not be taken due to a fact that the camera is operated before the photographer understands how to reflect his or her intention on exposure.

SUMMARY OF THE INVENTION

It is an object of the present invention to provide a camera with a barrier wherein a photograph with proper exposure can be produced without taking anything into consideration so far as the barrier is closed.

It is another object of the invention to provide a camera with a barrier wherein change-over of an operation mode thereof can be effected in response to a position or a motion of the barrier.

BRIEF DESCRIPTION OF THE DRAWINGS

FIG. 2 is a block circuit diagram showing entire construction of electric circuitry of the camera of FIG. 1a;

FIG. 3 is an illustration of all display segments to be displayed by a display device of the camera of FIG. 1a;

FIGS. 4a, 4b, 4c, 5a, 5b, 5c and 6a, 6b are illustrations of the display device of FIG. 3 indicating different display;

FIG. 7 is a diagram illustrating characteristics of a plurality of automatic exposure programs employed in the camera of FIG. 1a;

FIGS. 9a and 9b are schematic illustrations showing construction of counters used in the camera of FIG. 1a;

FIGS. 10, 11a, 11b and 12 are flow charts illustrating operation of the camera of FIG. 1a;

FIGS. 16a and 16b are illustrations of all display segments to be displayed by a display device of the camera of FIG. 15a;

FIG. 21 is a block circuit diagram showing entire construction of electric circuitry of the camera of FIG. 20a;

FIGS. 22a, 22b and 23a, 23b are flow charts illustrating operation of the camera of FIG. 20a; and FIGS. 24a and 24b are illustrations of all segments to be displayed by a display device of the camera of FIG. 20a.

DETAILED DESCRIPTION OF THE PREFERRED EMBODIMENTS

Figure 2:
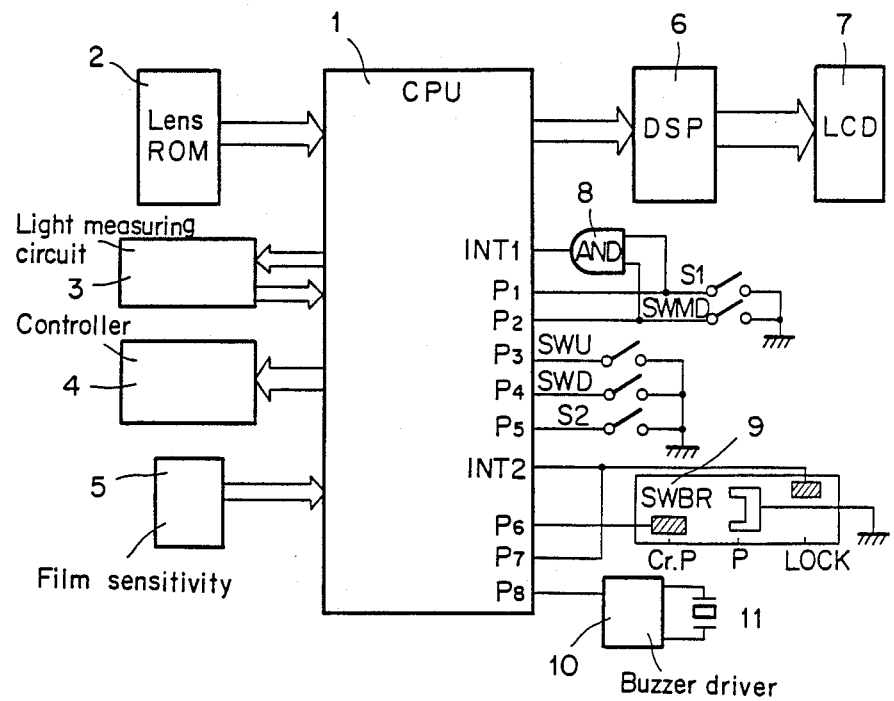

Now, preferred embodiments of the present invention will be described in detail with reference to the accompanying drawings. Referring first to FIG. 2, there is shown a camera selectively operable in a plurality of programmed automatic exposure control modes (hereinafter referred to as program modes) according to a first preferred embodiment of the present invention. The camera shown includes a CPU (central processing unit) 1 which controls the entire camera and executes calculations for exposure and so on. The camera further includes a lens ROM (Read Only Memory) 2 located within an interchangeable or exchangeable lens and having stored therein specific data of the individual lens such as a focal length, macro information representing that whether or not a focus adjusting of the interchangeable lens is within a macro range a full open diaphragm aperture value, a minimum diameter diaphragm aperture value and so on. A light measuring circuit 3 measures the brightness of an object to be photographed using a light receiving element such as an SPC (silicon photo cell), converts the measured brightness from an analog to a digital value, and delivers it to the CPU 1. A controller 4 controls operation of a diaphragm aperture and a shutter in response to an instruction from the CPU 1. A film sensitivity reading device 5 automatically reads a CAS code on a film cartridge and delivers an ISO value of it to the CUP 1. The film sensitivity reading device 5 may be constructed to deliver manually set ISO value. A display control device 6 receives display data from the CPU 1 and drives an LCD (liquid crystal display) 7 in response to the display data to indicate a program mode and so on. A light measuring switch S1 is turned on by depression of a shutter release button to a first position or depth and a shutter release switch S2 is turned on by depression of the release button to a second position or greater depth. A key switch SWMD operates in response to depression of a program mode key of the camera, and key switches SMU and SMD operate in response to depression of an up key and a down key, respectively. An additional switch 9 operates in response to displacement or movement of a barrier located at an upper part of the camera and provides a signal representing the position of the barrier. A buzzer driver 10 drives a sound generating member 11 such as a piezo-electric buzzer in response to a signal from the CPU 1. An AND gate 8 is coupled to receive, at two input terminals thereof, a signal from the switch S1 and a signal from the switch SWMD. The CPU 1 has two interrupt terminals INT1 and INT2, and interruption of the CPU 1 occurs when a signal which changes from a high ("H") level to a low ("L") level is received at any of the interrupt terminals INT1 and INT2. Output of the AND gate 8 is coupled to the interrupt terminal INT1 while a connecting contact on a circuit board corresponding to a position LOCK of the barrier switch 9 is connected to the terminal INT2. The CPU 1 is further constructed to receive a signal from the switch S1 at a first port P1 thereof, a signal from the switch SWMD at a second port P2, a signal from the switch SWU at a third port P3, a signal from the SWD at a fourth port P4, and a signal from the switch S2 at a fifth port P5 thereof. The CPU 1 has a further port P6 to which a connecting contact on the circuit board corresponding to another position Cr.P of the barrier switch 9 is connected. Further, input of the buzzer driver 10 is connected to a yet further port P8 of the CPU 1.

Figure 1A:
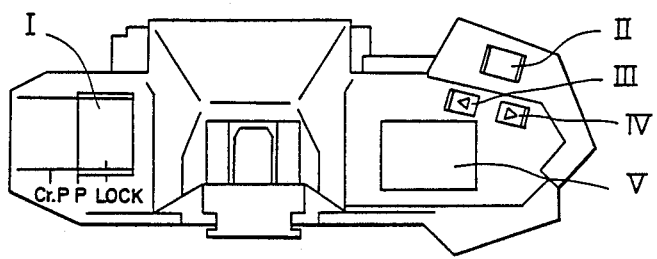
FIGS. 1a, 1b and 1c are plan views of a camera with a barrier according to an embodiment of the present invention, showing the barrier in different positions.
Figure 1B:
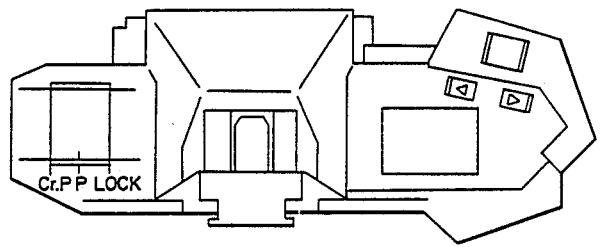
Figure 1C:
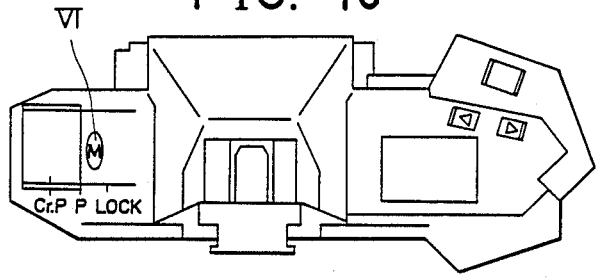
Figure 3:
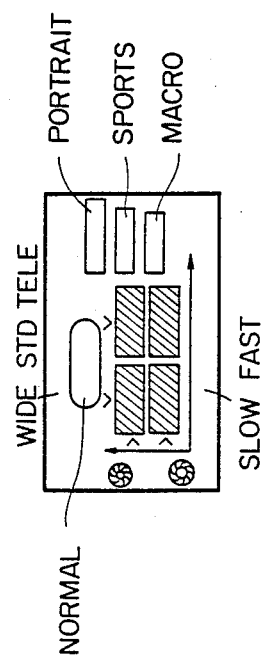

FIGS. 1a to 1c show plan views of the camera according to the present embodiment of the invention. In these figures, the barrier switch mentioned above is denoted at reference symbol I and serves also as a main switch. In a first position LOCK as shown in FIG. 1a the camera does not operate. In a second position P of the barrier switch I as shown in FIG. 1b, operation of the camera under a normal program which will be hereinafter described is enabled, but selection of a program for exposure, i.e., a desired exposure to produce a particular photographic effect intended by a user, is prohibited. In a third position Cr.P as shown in FIG. 1c operation of a program mode key VI which is covered by the barrier when the barrier switch I is at any other position is allowed to allow selection of one of three programs for a desired exposure which will be hereinafter described. A shutter release button II, a down key III, an up key IV, and an LCD display device V are also located on the top of the camera. FIG. 3 shows an illustration of all display segments to be displayed by the LCD display device V. It is to be noted that all display characters may be printed on the LCD display device so that they can be observed dimly when none of the display segments of the LCD display device is lit or energized.

Figure 7:
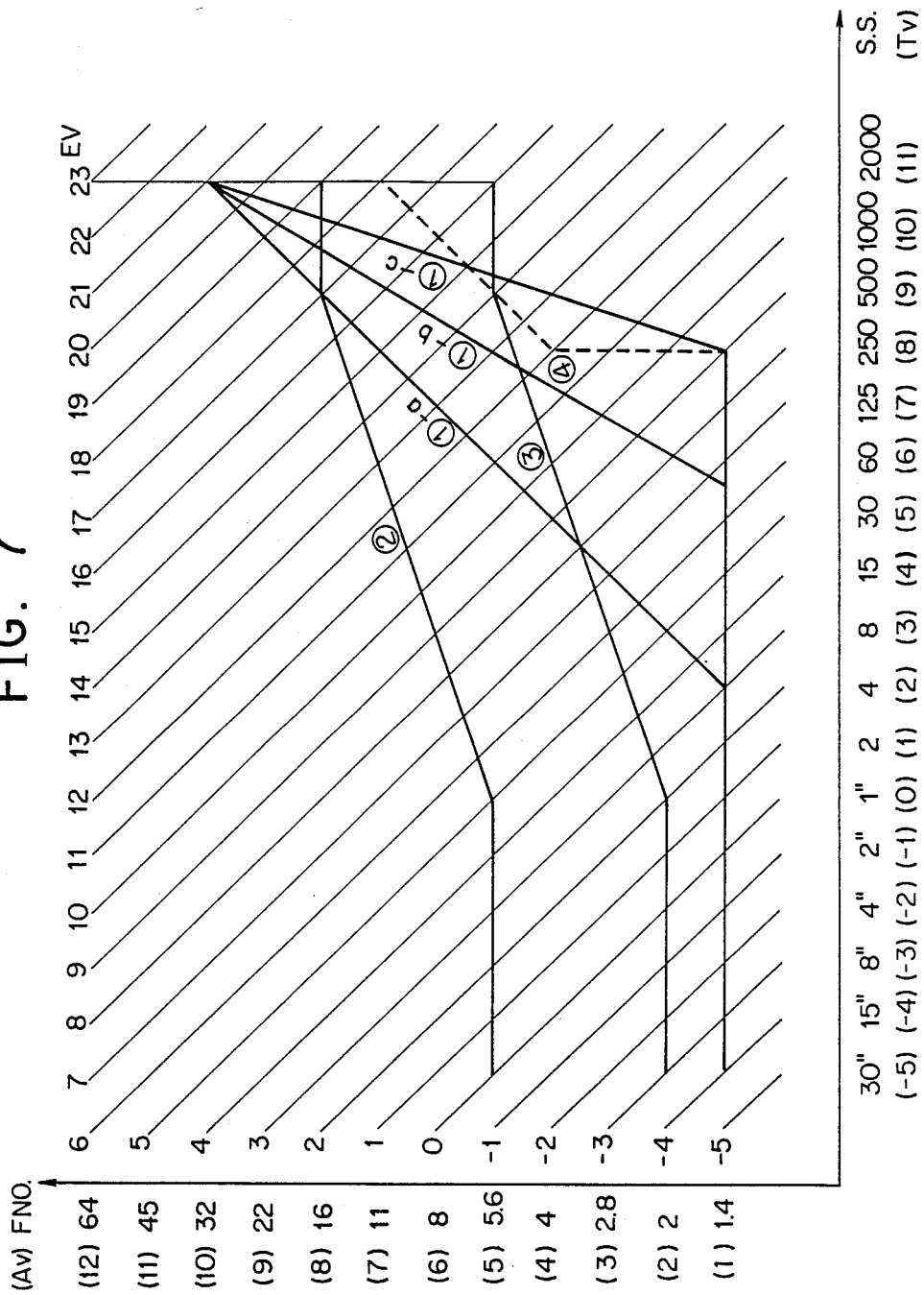

FIG. 7 shows exposure program lines to be selectively controlled by this embodiment. In FIG. 7, lines ①-a, ①-b, ①-c represent normal programs wherein the line ①-a represents a normal program where the focal length is relatively short, the line ①-b represents another normal program where the focal length is average, and the line ①-c represents a further normal program where the focal is relatively long. A still further line ② represents a macro program wherein the diaphragm aperture is relatively stopped-down while the depth of field is relatively deep. A yet further line ③ represents a portrait program wherein the diaphragm aperture is rather open while the depth of field is shallow in order to attain an effect to shade off the background relative to a main object. A yet further line ④ represents a sport program wherein a high shutter speed is preferred.

Figure 8:
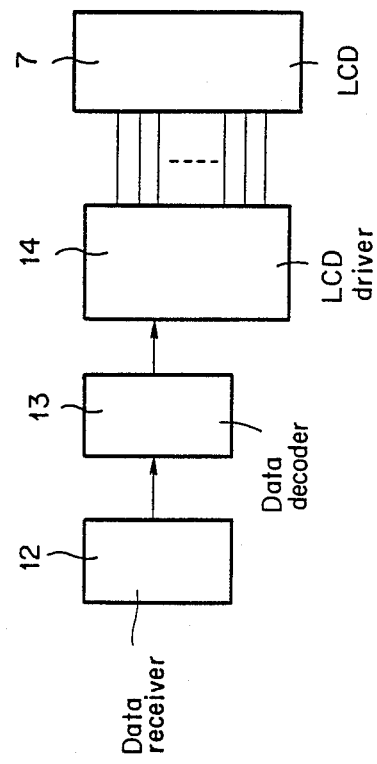
FIG. 8 is a block diagram of a display control device employed in the camera of FIGS. 1a to 1c.

FIG. 8 illustrates construction of the display controller. The display controller shown includes a data receiver 12 which receives display data from the CPU 1. The display controller further includes a data decoder 13 which decodes data received at the data receiver 12 and transmits to an LCD driver 14 signals representing what is or are to be displayed. The LCD display driver 14 drives the LCD 7 in response to signals from the data decoder 13 to give indications as shown in FIG. 4a, 4b, 4c, 5a, 5b, 5c, 6a or 6b.

Now, operation of the camera according to the present embodiment of the invention will be described with reference to flowcharts of FIGS. 10, 11a, 11b and 12.

Figure 9B:
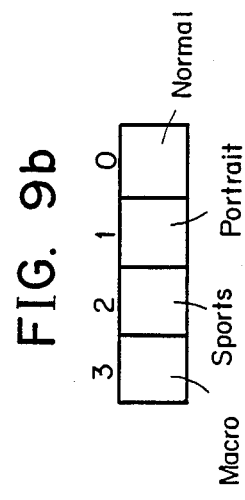
Figure 9A:
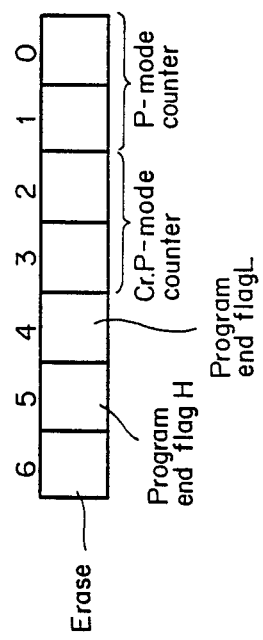

At first when a power becomes available in the camera, the CPU 1 starts reset operation beginning from step #1. At step #1, the I/O terminals of the CPU 1 are initialized, and then at step #2, internal registers or memory of the CPU 1 are initialized. Then at step #3, an erasing data is set to a display data register. The display data register includes a portion for data of 7 bits and another portion for data of 4 bits as illustrated in FIGS. 9a and 9b, respectively, and the bits 0 and 1 of FIG. 9a constitute a program mode counter the contents of which indicates one of three available normal program modes: in case the program mode counter indicates $00_{(2)}$, a normal wide program is selected; in case it indicates $01_{(2)}$, a normal standard program is selected; and in case it indicates $10_{(2)}$, a normal tele program is selected. The bits 2 and 3 of the display data register portion shown in FIG. 9a constitute a creative program mode counter the contents of which indicates a selected one of four programs: in case $00_{(2)}$ is indicated by the creative program mode counter, a normal program is selected; in case 01(2) is indicated, a sports program is selected; in case 10(2) is indicated, a portrait program is selected; and in case 11(2) is indicated, a macro program is selected. Further, the bit 4 of the display data register portion of FIG. 9a indicates a program end flag L which is set in order to indicate a low brightness condition when the brightness is lower than a predetermined level. In such a low brightness condition, any of the programs provides only limited combination of lower shutter speed and open aperture side, resulting in lack of effectiveness in exposure. The bit 5 of the display data register portion of FIG. 9a indicates a program end flag H which is set when the effectiveness lacks on a high brightness contrary to the program end flag L. The bit 6 of the display data register portion of FIG. 9a indicates an erasing or extinguishing data bit which causes, when it is "1", all of the display segments are extinguished of deenergized. Contents of the display data described above are shown in Table 1.

TABLE 1

| Erase | P.E.F. H | P.E.F. L | Cr.P-mode Counter | P-mode Counter | P. Mode Indication |
|---|---|---|---|---|---|
| 0 | 0 | 0 | 0 | 0 | Normal Wide |
| 0 | 0 | 0 | 0 | 1 | Normal Standard |
| 0 | 0 | 0 | 0 | 2 | Normal Tele |
| 0 | 0 | 0 | 1 | * | Sports |
| 0 | 0 | 0 | 2 | * | Portrait |
| 0 | 0 | 0 | 3 | * | Macro |
| 0 | 0 | 1 | * | * | Attention to Low Brightness |
| 0 | 1 | 0 | * | * | Attention to High Brightness |
| 1 | * | * | * | * | No Indication |

The display data of the display data register portion shown in FIG. 9b represents effective programs where "1" represents that the program is selected and effective and "0" represents that the program is ineffective even if it is selected, and a character or characters representing an effective program or programs are indicated by energization. Of the display data of the display data register portion shown in FIG. 9b, the bit 0 indicates the normal program, the bit 1 the portrait program, the bit 2 the sports program, and the bit 3 the macro program, and thus the display data represents a selected program mode.

Then, after the erasing data has been set to the display data register at step #3, it is delivered, at step #4, to the display controller 6. Upon reception of the display data, the display controller 6 causes the entire LCD 7 to be extinguished. Subsequently at step #5, interruption by way of the input terminals INT1, INT2 is enabled, and then at step #6, the CPU 1 is put into a sleep mode. The sleep mode is a power save mode in which internal clock of the CPU 1 stops and contents of the memory or registers are maintained. The normal mode is entered again from the sleep mode either when the CPU 1 is reset or when interruption occurs by a signal received at the terminal INT1 or INT2 of the CPU 1.

If the shutter release button (II of FIG. 1a) is depressed to the first position or depth, the switch S1 is turned on. This causes the input to the terminal INT1 via the AND gate 8 to be changed from a high ("H") level state to a low ("L") level sate thereby to cause interruption of the CPU 1. Upon interruption at the terminal INT1, the CPU 1 transfers its sequence to step #12. At step #12, interruption by way of the terminal INT1 is inhibited in order that unnecessary additional interruption may not be caused during operation or processing. Subsequently at step #13, a state of the port P7 is checked. The port P7 of the CPU 1 is constructed to receive a signal from the barrier switch 9 which exhibits the "L" level when the barrier I is at the LOCK position. When the input signal at the port P7 is at the "L" level, the sequence advances to step #7. But here, it is assumed that the barrier is not at the LOCK position. Accordingly, the port P7 receives an "H" level signal, and hence the sequence advances from step #13 to step #14. At step #14, the film sensitivity reading device 5 reads a film sensitivity data (ISO value) recorded on a film cartridge, and the film sensitivity thus read is taken into the CPU 1. Subsequently at step #15, lens data are taken into the CPU 1 from the lens ROM 2 installed within an interchangeable lens. Such lens data include focal length, macro information, full open diaphragm aperture value, minimum diameter diaphragm aperture value and so on. After such lens data have been taken in, the sequence advances to step #16 at which a signal instructing starting of light measurement is delivered to the light measuring circuit 3. Consequently, the light measuring circuit 3 starts light measurement and develops a measured value in the form of a digital value converted from an analog value. Subsequently at step #17, a state of the port P6 is checked. The port P6 is connected to the barrier switch 9 and receives an "L" level signal when the barrier is at the creative program (Cr.P) position but receives an "H" level signal when the barrier is at any other position. In case the signal at the port P6 is at the "H" level, the normal program is to be selected wherein another program cannot be selected. Thus, steps from #18 to #24 are skipped and the sequence advances to step #25 after the creative program mode counter is set to "0" at step #17-1. On the contrary, in case the signal at the port P6 is at the "L" level at step #17, the sequence advances to step #18 at which a state of the port P2 is checked. The port P2 is connected to the program mode switch SWMD and receives an "L" level signal when the program mode key is depressed. Selection of another program is achieved by depressing either the up key (IV in FIG. 1a) or the down key (III in FIG. 1a) once while the program mode key is held depressed. Accordingly, where an "H" level signal is received at the port P2, the program mode key is not depressed, and thus the CPU 1 determines that there is no will to change a program line and advances the sequence to step #26 skipping steps #19 to #25. Meanwhile, in case the signal at the port P2 is at the "L" level at step #18, the CPU 1 determines that the program mode key is depressed and advances the sequence to step #19 at which a state of the port P3 connected to the up key switch SWU is checked. If the port P3 has been changed from the "H" to the "L" level state, the sequence advances to step #21 at which the contents of the creative program mode counter is incremented by one and then advances to step #25. To the contrary, in case the "H" or "L" level state of the port P3 still continues at step #19, the sequence advances to step #20 at which a state of the port P4 connected to the down key switch SWD is checked. In case the port P4 has been changed from the "H" to the "L" level state, the sequence advances to step #22 at which the contents of the creative program mode counter is decremented by one and then advances to step #23. On the other hand, when it is determined at step #20 that the port P4 continues its "H" or "L" level state, the sequence advances to step #26 because neither of the down key and the up key is depressed again. The creative program mode counter is a 2-bit counter as shown in FIG. 9a and presents $00_{(2)}$ when it is incremented by one from $11_{(2)}$ and presents $11_{(2)}$ when it is decremented by one from $00_{(2)}$. Then at step #23, if it is determined that the creative program mode counter contains a value of 3 [=$11_{(2)}$], the sequence advances to step #24, but where the creative program mode counter contains a value other than 3 [=$11_{(2)}$], the sequence jumps to step #26. Here, the available programs include the normal program, the portrait program, the macro program and the sports program, and the value "0" of the creative program mode counter corresponds to the normal program, "1" to the sports program, "2" to the portrait program, and "3" to the macro program. Here the macro program can be selected only where focus adjusting of the lens is within a macro range. Accordingly, if the creative mode counter indicates "3" at step #23 and hence the sequence advances to step #24, here the CPU 1 discriminates from the lens data read at step #15 whether or not the lens is within a macro range, and in case it is determined that focus adjusting of the lens is within the macro range, the sequence advances to step #26 while maintaining the value "3" of the creative program mode counter. On the contrary, in case it is determined at step #24 that focus adjusting of the lens is not within the macro range, the sequence advances to step #25 at which the contents of the creative program mode counter is set either to "0" or to "2" depending upon whether it is to be incremented or decremented in order that the macro program may not be entered, whereafter the sequence advances to step #26.

Figure 11A:
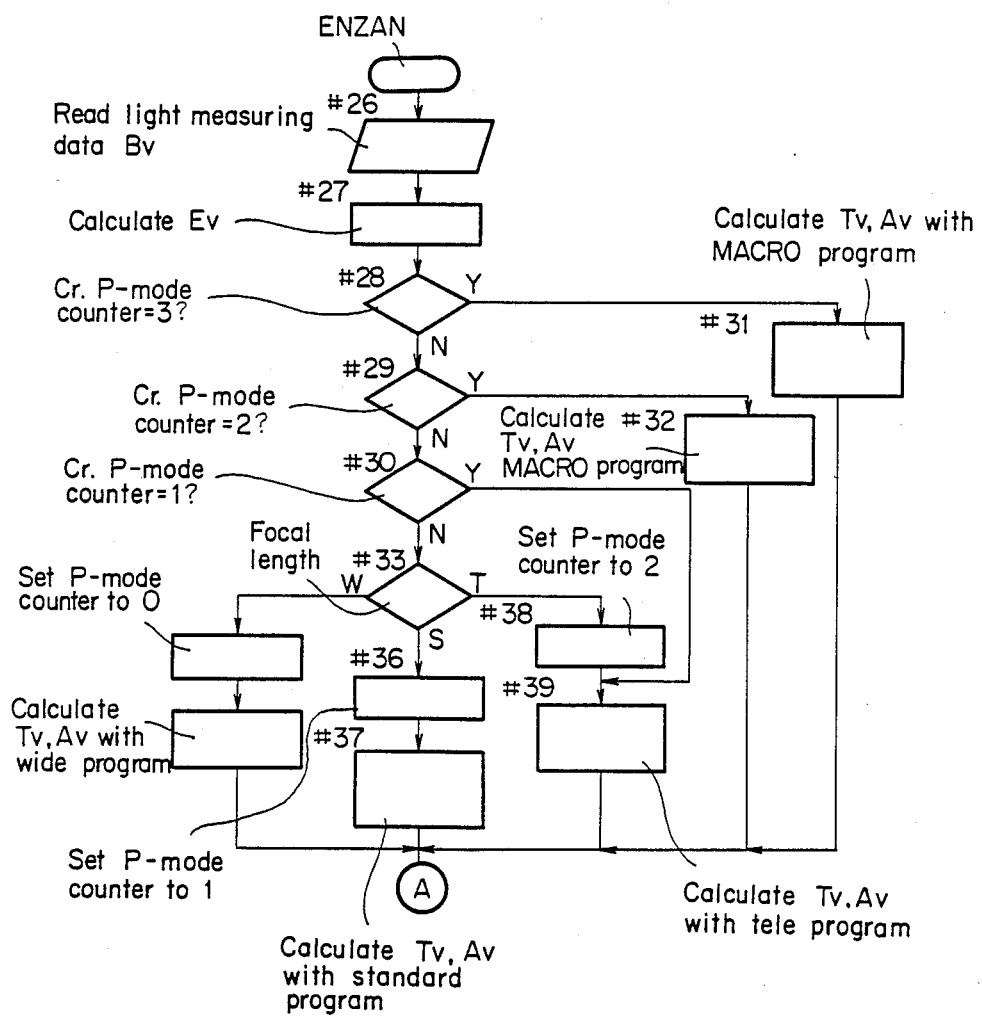

Referring now to FIG. 11a, at step #26, a brightness Bv of an object is read in as light measurement data from the light measuring circuit 3. Subsequently at step #27, an exposure value Ev (=Sv+Bv) is calculated from the film sensitivity Sv read in at step #14 and the object brightness Bv. Then at steps #28 to #30, a program to be selected is discriminated from a value of the creative program mode counter. In particular, at step #28, the value of the creative program mode counter is checked if it is equal to "3", and in case the value is "3", the macro program is selected and the sequence advances to step #31 at which the CPU 1 determines values of Tv (shutter speed) and Av (f-number) corresponding to the value Ev from the macro program line ②' FIG. 7. Otherwise, at step #29, the creative program mode counter is checked again, and where the value thereof is "2", the portrait program is selected and the sequence advances to step #32 at which values of Tv and Av corresponding to the value Ev and determined from the portrait program line ③ of FIG. 7. Or else, at step #30, the creative program mode counter is checked yet again, and where the value thereof is "1", the sports program is selected and the sequence advances to step #39.

The sports program and the tele program within the normal program both prefer a high shutter speed and hence they are common in this respect. Accordingly, also in the case of the sports program, values Tv and Av corresponding to the value Ev are determined, at step #39, from the tele program line (①-c of FIG. 7). Naturally, an independent program line may otherwise be provided for the sports program. A program line ④ in FIG. 7 shows an example of such independent program line. In this case, values Tv and Av may be determined from the line ④ of FIG. 7 similarly as in the macro program or the portrait program.

In case the checking of the creative program mode counter at step #30 reveals that the value of the counter is not equal to "1" (and hence is equal to "0" here), the normal program is selected and the sequence advances to step #33. Here, up to three programs are prepared for different ranges of focal length of the interchangeable lens. As for division of focal length, it may be recommendable that where the focal length is smaller than 35 mm, the wide program is assigned, otherwise where it is equal to or greater than 35 mm and equal to or smaller than 100 mm, the standard program is assigned, and otherwise where it is greater than 100 mm, the tele program is assigned. Thus, in case it is determined at step #33 that the focal length is smaller than 35 mm, the sequence advances to step #34 at which the program mode counter is set to "0". Then at step #35, values Tv, Av corresponding to the value Ev are determined from the wide program line (①-a of FIG. 7). Otherwise in case it is determined at step #33 that the focal length is within a range from 35 mm to 100 mm, the sequence advances to step #36 at which the program mode counter is set to "1" and then to step #37 at which values Tv, Av corresponding to the value Ev are determined from the standard program line (①-b of FIG. 7). Or otherwise in case it is determined at step #33 that the focal length exceeds 100 mm, then the sequence advances to step #38 at which the program mode counter is set to "2" and then to step #39 at which values Tv, Av corresponding to the value Ev are determined from the tele program line (①-c of FIG. 7). After the values Tv, Av have been determined by any one of the available programs, the sequence advances to step #40 of FIG. 11b.

Figure 11B:
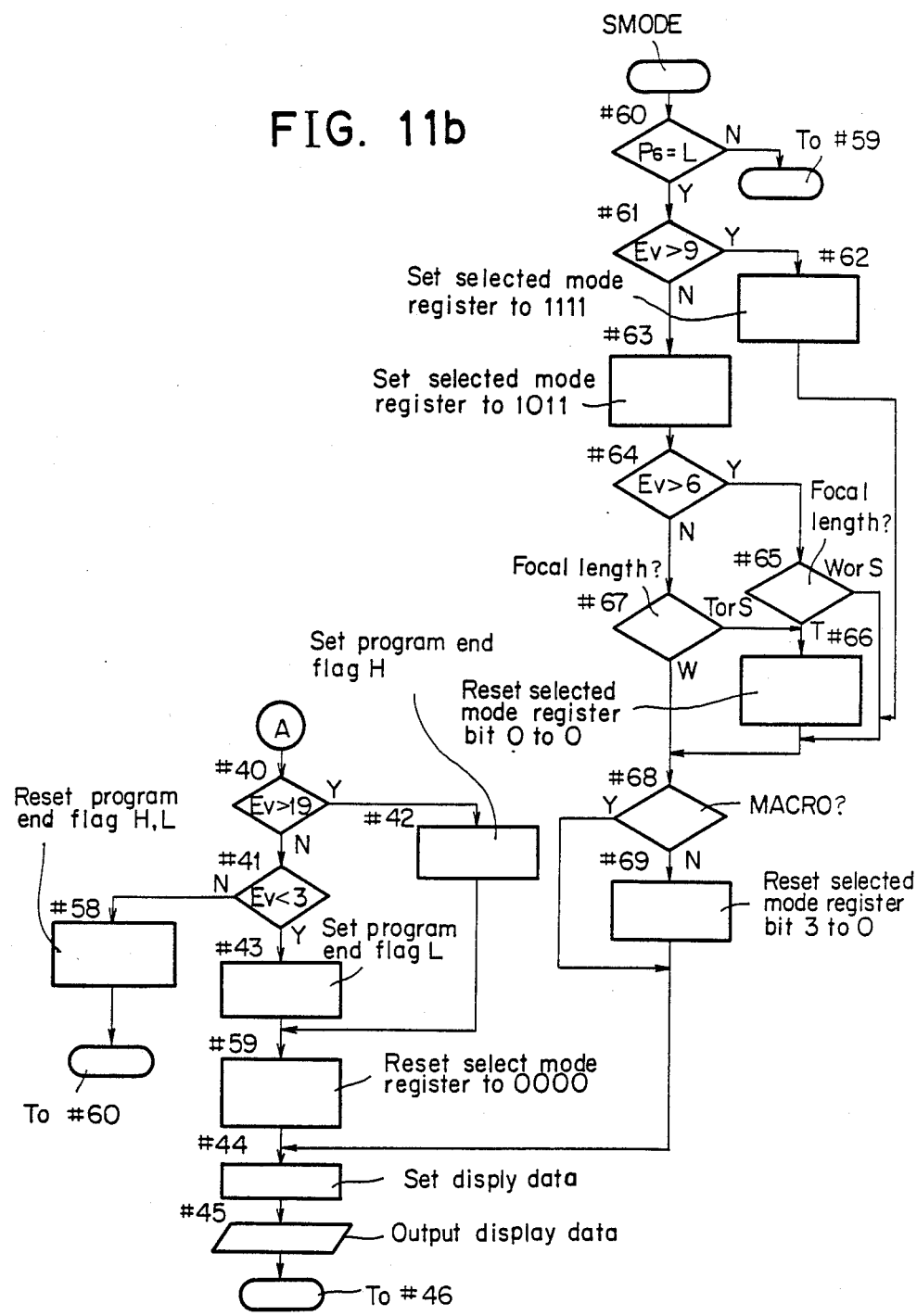

Referring now to FIG. 11b, the value Ev is checked at step #40. If the value Ev exceeds "19", combinations of values Tv and Av are limited to those of a higher speed and smaller diameter diaphragm aperture side, and accordingly the program end flag H which indicates this condition is set subsequently at step #42. On the contrary in case the value Ev is equal to or smaller than "19" at step #40, the sequence advances to step #41 at which the value Ev is checked again, and in case the value Ev is smaller than "3", then the sequence advances to step #43. In this case, combinations of values Tv and Av are limited to those of a lower speed and open diaphragm aperture side, and accordingly, the program end flag L indicating this condition is set at step #43. To the contrary, where the value Ev is equal to or greater than "3" at step #41, the sequence advances to step #58 at which the program end flags H, L are reset. From step #42 or #43, the sequence advances to step #59 at which all the selected modes are canceled, that is, the display data register portion shown in FIG. 9b is reset to "0", in order to cause the display device to indicate that there is no effective program. From step #58 on the other hand, the sequence advances to step #60 at which a state of the port P6 is checked, and in case the port P6 is at the "H" level since the barrier is at the position P, then the sequence advances to step #59 at which all the selected mode register portion is reset to "0". To the contrary, where the port P6 is at the "L" level at step #60 since the barrier I is at the position Cr.P, the sequence advances to step #61 at which the value Ev is checked, and where it is greater than "9" (when 9<Ev≦19), the sequence advances to step #62. In this case, all the programs are available for desired photographing effects and thus the selected mode register portion is set to "1111$_{(2)}$". After then, the sequence advances to step #68. On the other hand, in case the value Ev is equal to or smaller than 9 at step #61, the sequence advances to step #63 at which the selected mode register portion is set to "1011$_{(2)}$". This is done with an intention to clear the bit 2 corresponding to the sports program because the effectiveness of the sports program cannot be expected within a range of Ev≦9. Subsequently the sequence advances to step #64 at which it is discriminated whether or not the value Ev is greater than "6". In case the value Ev is greater than "6" (when 6<Ev≦9), the sequence advances to step #65 at which a focal length of the lens is checked from the lens data, and then in case the focal length is on the tele side, that is, greater than 100 mm, the sequence advances to step #66 at which the bit 0 for the selected mode is reset to "0". This is because the normal tele program will lose its effectiveness. To the contrary, in case the focal length is equal to or smaller than 100 mm at step #65, the sequence advances to step #68. The sequence advances to step #68 also from step #66. On the other hand, in case the value Ev is equal to or smaller than "6" (when 3≦Ev ≦6) at step #64, the sequence advances to step #67 at which the focal length of the lens is checked, and if it is equal to or greater than 35 mm and hence it is on the standard or the tele side, the sequence advances to step #66 at which the bit 0 for the selected mode is reset to "0". This is also because the normal standard and the tele programs will lose their effectiveness. On the other hand, where the focal length is smaller than 35 mm at step #67, the sequence advances to step #68 at which it is judged from the lens data whether or not the lens is within the macro range, and in case that it is not within the macro range, the bit 3 for the selected mode is reset to "0". This is intended, where the lens is not within the macro range, to prohibit selection of the macro program and accordingly to prohibit display of its effectiveness. In case it is determined at step #68 that the lens is within the macro range, and from step #69, the sequence advances to step #44 at which the data of the program mode counter, the creative program mode counter, the program end flags H, L, the erasing bit and the selected mode register portion are set as display data to the display data register.

Subsequently at step #45, the display data are outputted to the display controller 6. The display controller 6 receives the display data at the data receiver 12 thereof shown in FIG. 8. Then, the display data are decoded at the data decoder 13, and thus decoded data representative of manners of display for the individual programs are delivered to the LCD driver 14. The LC driver 14 thus drives required segments of the LCD 7 in response to the delivered data to cause the LCD 7 to give required indications. Examples of such indications for the individual programs are shown in FIGS. 4a to 4c, 5a to 5c, and 6a and 6b. A characteristic of the indications here is that a combination of a shutter speed and a diaphragm aperture for a selected program is indicated in a rough design pattern in order that characteristics of the selected program may be observed at a glance.

Figure 4A:
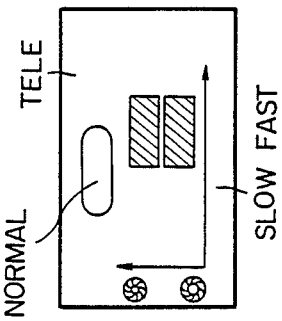
Figure 4B:
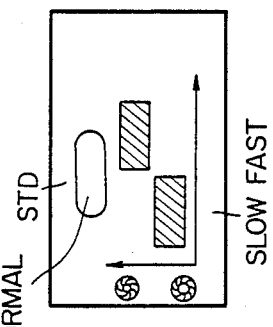
Figure 4C:
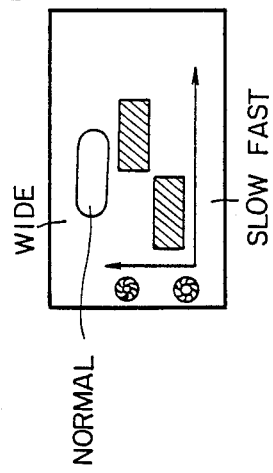

FIGS. 4a to 4c illustrate display patterns when the normal program is executed. In particular, FIG. 4a illustrates a display pattern for the wide program which indicates that the program covers almost from a low shutter speed and open diaphragm aperture side to a high shutter speed and closed diaphragm aperture side. FIG. 4b illustrates a display pattern for the standard program, which is similar to the display pattern for the wide program. FIG. 4c illustrates a display pattern for the tele program, from which it can be readily seen that the program is provided rather for a higher shutter speed. Meanwhile, FIGS. 5a to 5c illustrate display patterns for the three programs other than the normal program in the creative program mode. In particular, FIG. 5a illustrates a display pattern for the portrait program, which indicates that the diaphragm aperture is rather open. FIG. 5b illustrates a display pattern for the macro program, from which it can be seen that the diaphragm aperture is rather closed contrary to the portrait program. FIG. 5c illustrates a display pattern for the sports program in which a high shutter speed is preferred. Groups of characters enclosed by broken lines in FIGS. 5a to 5c are indicated in successively lit manner and each indicate a selectable or replaceable effective program mode. By such an indication, it can be observed to which program a photographing intention is reflected when selected. A selected program is indicated in a flickering manner. On the other hand, FIGS. 6a and 6b illustrate display patterns when effective ranges of the programs are exceeded. In particular, FIG. 6a illustrates a display pattern where the brightness of an object is too low and hence the program end flag L is in the set state, and FIG. 6b illustrates a display pattern where the brightness is too high and hence the program end flag H is in the set state. In either of FIGS. 6a and 6b, it can be seen that the shutter speed and the diaphragm aperture value are one-sided, and a mark ">" representing a warning is lit. This indication represents that whichever program is selected, the brightness of the object is one-sided and hence a photographing intention cannot be reflected. Further, in case a less effective program, that is, a program other than any of the lit programs shown in FIGS. 5a to 5c, in selected display characters of the thus selected program are caused to flicker at a frequency different from that when an effective program is selected in order to give a warning.

Figure 12:
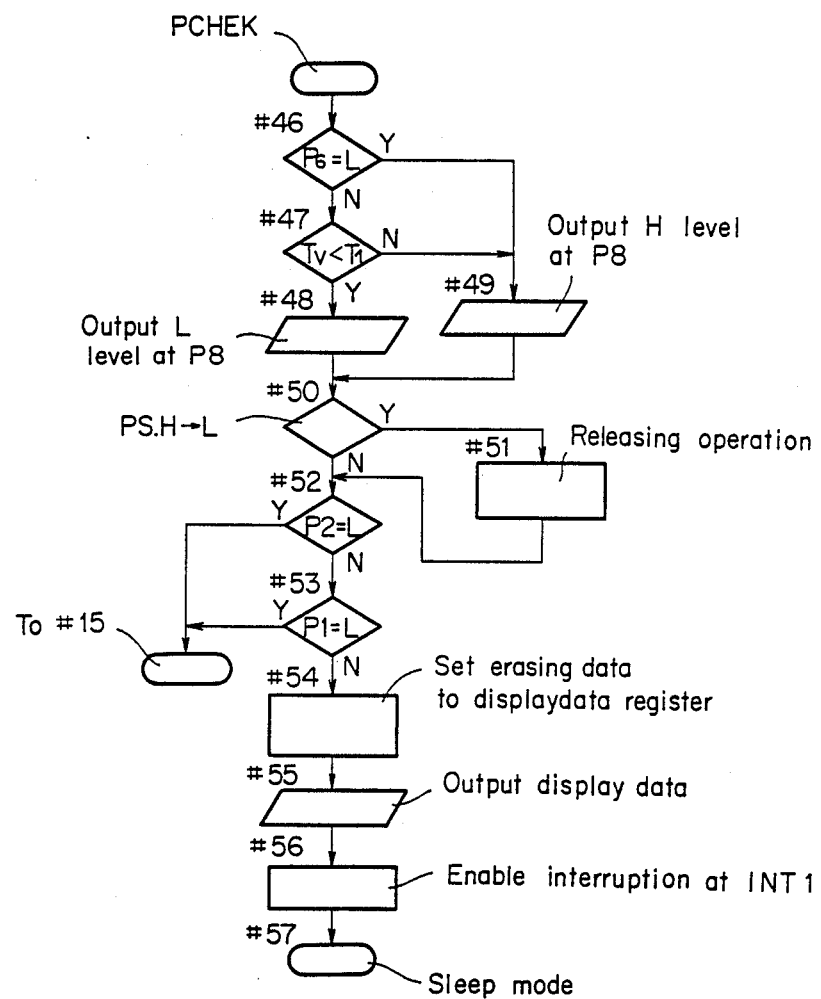

After the display data have been delivered from the CPU 1, the sequence then advances to step #46 shown in FIG. 12 at which a state of the port P6 is checked. Referring to FIG. 12, in case the port P6 is at the "L" level since the barrier I is at the Cr.P position (creative program position), the sequence advances to step #49 at which the CPU 1 outputs an "H" level at the port P8 thereof. On the contrary when the port P6 is at the "H" level at #46 since the barrier is at the P position (normal program position), the sequence advances to step #47 at which the value Tv is checked. If the value Tv is smaller than T$_1$, then an "L" level is outputted at the port P8 at subsequent step #48 in order to give a warning representing a possibility of the shake of the camera due to the handling. The value T$_1$ is an exposure time value Tv represented in an APEX form which corresponds to a shutter speed of a value of a reciprocal number to a value of the focal length of the lens or so. The buzzer driver 10 is connected to the port P8, and when the "L" level is outputted at the port P8, the buzzer driver 10 drives the buzzer 11 to give a warning by way of sound. Accordingly, a warning for the camera shake by way of the buzzer is provided at the normal program position (P position) of the barrier and is not provided at the creative program position (Cr.P position). Subsequently the sequence advances to step

50 at which a state of the port P5 is checked, and if the port P5 has been changed from the "H" to the "L" level state, this indicates that the release button is depressed to the second position or depth thereof at which the switch S2 is turned on. Accordingly, the sequence then advances to step #51 at which a shutter releasing operation is achieved. Upon shutter releasing operation, several instructions are successively delivered from the CPU 1 to the controller 4 in order to achieve stop-down of the diaphragm aperture, upward movement of a mirror, actuation of the shutter and so on.

To the contrary, if it is determined at step #50 that the "H" or "L" level state still continues at the port P5, the sequence advances not to step #51 but directly to step #52. Also where a shutter releasing operation is done at step #51, the sequence advances to step #52. At step #52, a state of the port P2 is checked, and in case the port P2 is at the "L" level, that is, when the switch SWMD is on, the sequence returns to step #15 of FIG. 10 in order to repeat a sequence beginning with the step #15. On the contrary where the port P2 is at the "H" level at step #52, now a state of the port P1 is checked at step #53, and if the port P1 is at the "L" level, that is, where the release button (II in FIG. 1a) is depressed to the first position, the program returns to step #15. On the contrary where the port P1 is at the "H" level at step #53, this indicates that the release button (II in FIG. 1a) is not depressed nor the program mode key (VI in FIG. 1c) is depressed. Consequently, the sequence advances to step #54 at which an erasing data is set as a display data to the display data register portion and then to step #55 at which the display data is delivered from the CPU 1. As a result, all indications are erased. Subsequently at step #56, interruption at the terminal INT1 is enabled additionally because interruption at the terminal INT2 is already enabled. Then at step #57, the CPU 1 enters the sleep mode again. Thus, either if the release button or the program mode key is subsequently depressed or if the barrier I is subsequently moved from the creative program position (Cr.P position) or the normal program position (P position) to the LOCK position, the CPU 1 will be interrupted thereby and thus rendered operative again.

Figure 10:
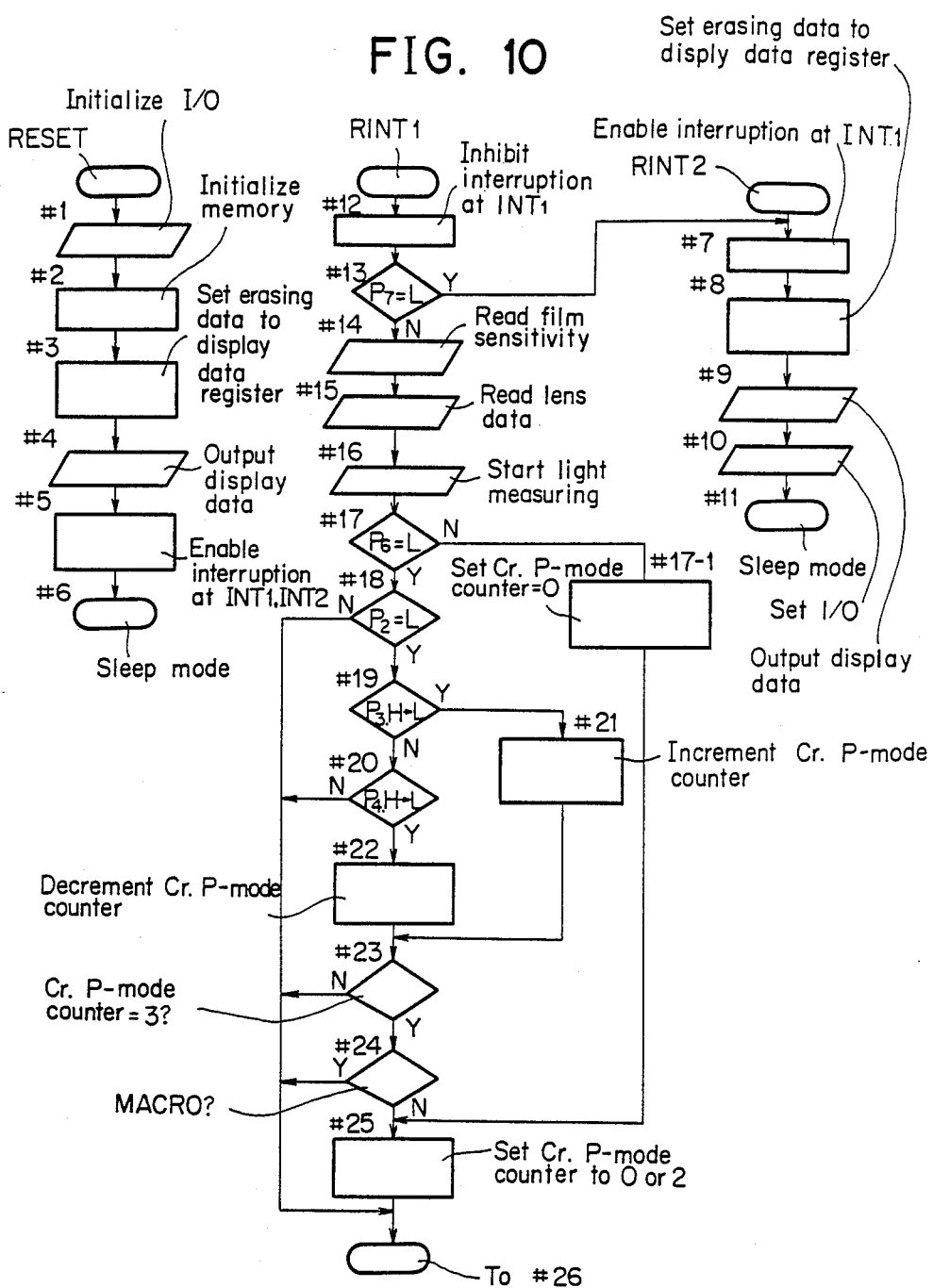

If the terminal INT2 is changed from the "H" to the "L" level state by movement of the barrier to the LOCK position, the CPU 1 is interrupted at the terminal INT2 and thus advances the program to step #7 shown in FIG. 10. At step #7, interruption at the terminal INT1 is first enabled. Then at step #8, an erasing data is set as a display data to the display data register, and then at step #9, the display data is delivered to the display controller 6 to erase all indications on the LCD 7. After then, the sequence advances to step #10 at which the individual I/O terminals of the CPU 1 are set again, and then at step #11, the CPU 1 enters the sleep mode again in which it stops its operation until it is interrupted at the terminal INT1 thereof.

Figure 13A:
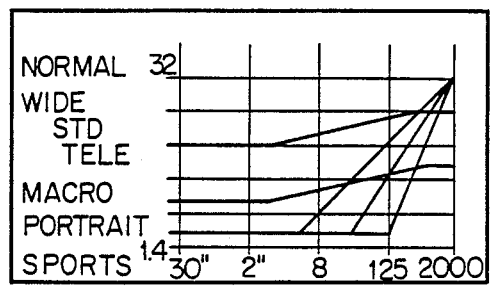
FIGS. 13a, 13b and 13c are illustrations of a display device of a modified form when different indications are given by the display device.
Figure 13B:
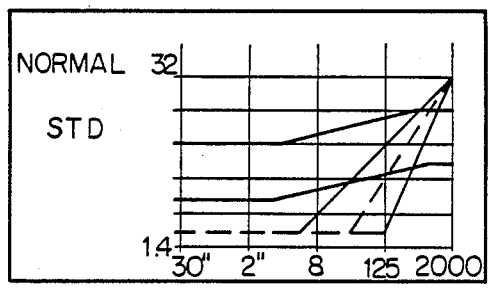
Figure 13C:
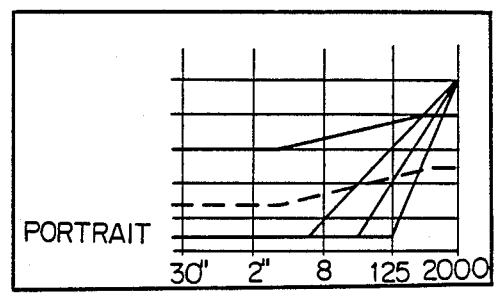

While description of operation of the camera according to the first embodiment of the invention has been given above, indication of a selected program may be modified in such a manner as shown in FIGS. 13a to 13c wherein program lines are displayed as they are. In particular, FIG. 13a indicates all display segments to be displayed by a display device. FIG. 13b indicates a display pattern when the standard program is selected in the normal program, and the standard program line indicated by a broken line may be caused to flicker in order to indicate that the standard program line is selected. FIG. 13c illustrates that the portrait program is selected, and also in this case, a selected portrait program line as indicated by a broken line may be caused to flicker. Also when any other program is selected, only the selected program line may be caused to flicker in a similar manner to indicate the same. Some other effective programs may be indicated by way of lighting in a similar manner in order to represent that the programs are effective.

It is to be noted that while it has been described that any other program other than effective programs can be selected, it is alternatively possible to allow selection of only an effective program or programs. In this instance, it may be advisable that at first the effectiveness of a program is checked after calculation of a value Ev, and then the up key and the down key are read, whereafter the contents of the creative program mode counter is restrictively incremented or decremented within a range corresponding to effective programs.

Figure 14:
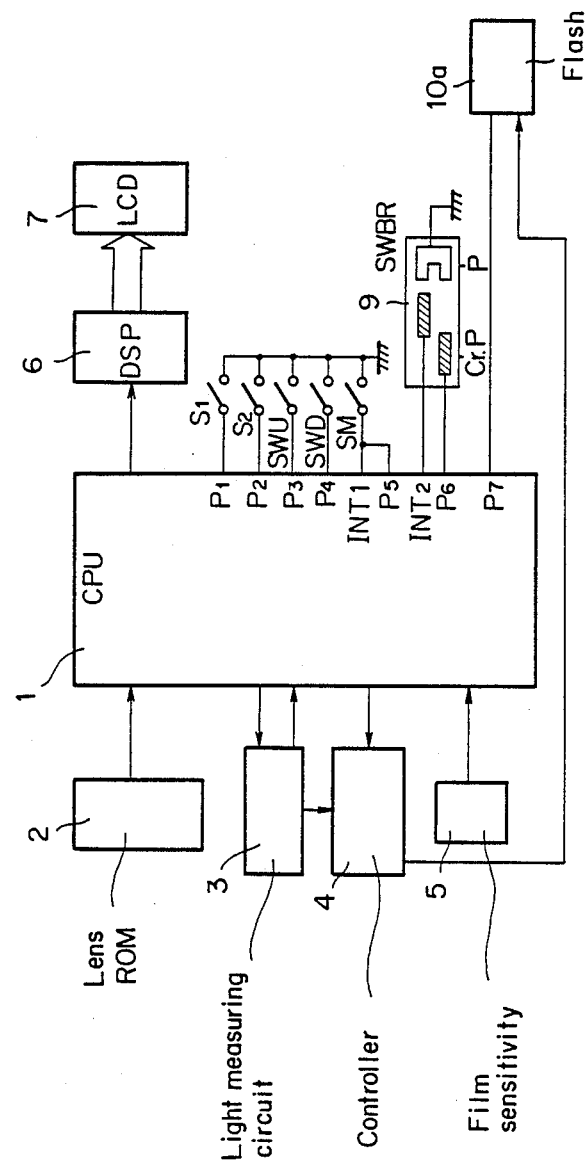
FIG. 14 is a block circuit diagram showing entire construction of electric circuitry of a camera according to another embodiment of the invention.

FIG. 14 is a block circuit diagram showing entire construction of a camera according to a second embodiment of the invention. Referring to FIG. 14, the camera shown includes a CPU 1 which achieves controlling of the entire camera and calculations for exposure and so on. A lens ROM (Read Only Memory) 2 is located within an interchangeable lens and has stored therein lens data such as data of a focal length, an open diaphragm aperture value, a minimum diameter diaphragm aperture value and so on. A light measuring circuit 3 measures a brightness of an object using a photoelectric transducer such as an SPC, converts the measured brightness from an analog into a digital value, and delivers it to the CPU 1. Upon photographing using a flash device 10a which will be hereinafter described, the light measuring circuit 3 additionally measures and integrates reflected light of the flash light reflected from the object, passed through the lens and reflected by a film plane and delivers, when the integrated value reaches an appropriate value, a signal for stopping emission of light to the flash device 10a. The camera further includes a controller 4 which controls, upon shutter releasing operation of the camera, operation of a diaphragm aperture, upward movement of a mirror, movement of a shutter and so on. A film sensitivity reader 5 reads a CAS code recorded on a film cartridge and delivers it to the CPU 1. A display controller 6 drives a LCD 7 in response to data received from the CPU 1 to make indications on an outside of the camera and within a finder. The camera further includes a switch 9 which operates in response to a barrier located at an upper part of the camera. The flash device 10a is connected to a port P7 of the CPU 1 and delivers to it a signal which represents completion of charging of a main capacitor for emission of flash light. The flash device 10a is further connected to receive from the controller 4 the signal instructing stopping of emission of light flash photography.

A light measuring starting swithc S1 is turned on by a shutter release button of the camera either being touched by a finger of an operator or being depressed to a first position or depth. A release starting switch $S_2$ is turned on by the release button being depressed to a second position deeper than the first position. Another switch SWU is provided to shift a combination of shutter speed and diaphragm aperture (hereinafter referred to as program shift) to an upper side, and a further switch SWD is provided to shift the combination to a lower side. A main switch SM of the camera is also provided, and when it is in an off position, all display segments are held in extinguished conditions and the release button is also mechanically or electrically held locked. A barrier switch SWBR (=switch 9) has two distinct positions between which an additional switch portion for causing interruption of the CPU 1 is located.

Figure 15A:
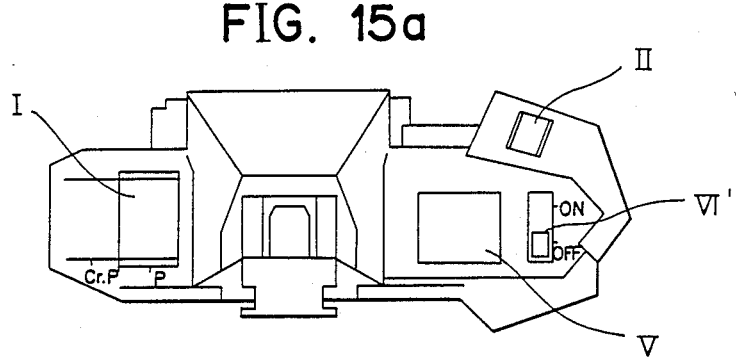
FIGS. 15a and 15b are plan views of the camera of FIG. 14 when a barrier is in different positions.
Figure 15B:
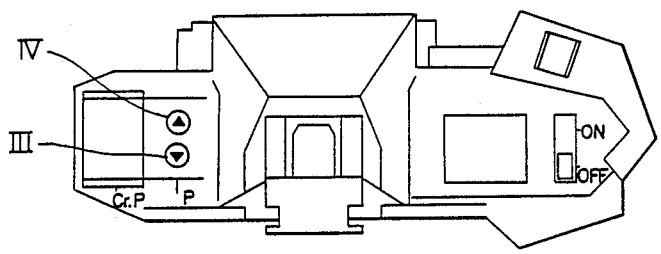

FIGS. 15a and 15b show plan views of the camera of the second embodiment. Referring to FIGS. 15a and 15b, a barrier I cooperates with the barrier switch mentioned above. The barrier I has two distinct positions including a position as indicated at P (normal program position) in FIG. 15a and another position as indicated at Cr.P (creative program position) in FIG. 15b. At the Cr.P position of the barrier I, a program up key IV and a program down key III are exposed outside to allow a program shift. The program up key IV cooperates with the switch SWU while the program down key III cooperates with the switch SWD. A release button II, a main switch VI' and a display window V which allows indication by the LCD 7 to be observed from the outside are also located at the top of the camera.

Figure 16A:
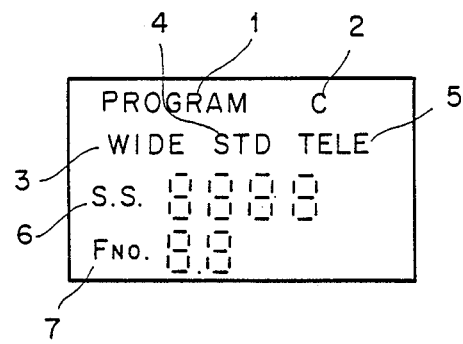
Figure 16B:
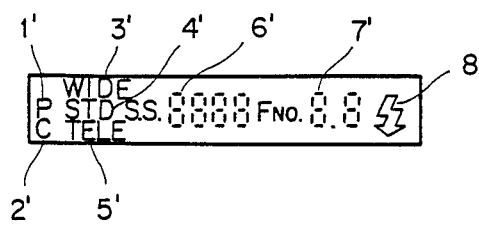

FIGS. 16a and 16b illustrate the LCD 7 when all of display segments thereof are lit. In particular, FIG. 16a illustrates indication on a body of the camera, and FIG. 16b illustrates indication within the finder. In FIGS. 16a and 16b display characters 1, 1' represent that the camera is in the program mode, display characters 2, 2' represent that the camera is in the creative program mode, and display characters 3, 3', 4, 4' and 5, 5' represent types of programs and correspond, a wide program, a standard program and a tele program, respectively. Display characters 6, 6' represent each a shutter speed (S.S.) to be controlled, and display characters 7, 7' represent each a diaphragm aperture value (f-number) to be controlled. A display mark 8 represents that the flash device 10a is in a charging completion state and is provided for indication only within the finder.

Now, operation of the camera of the present embodiment will be described with reference to flow charts of FIGS. 18a, 18b and 19a, 19b.

Figure 18A:
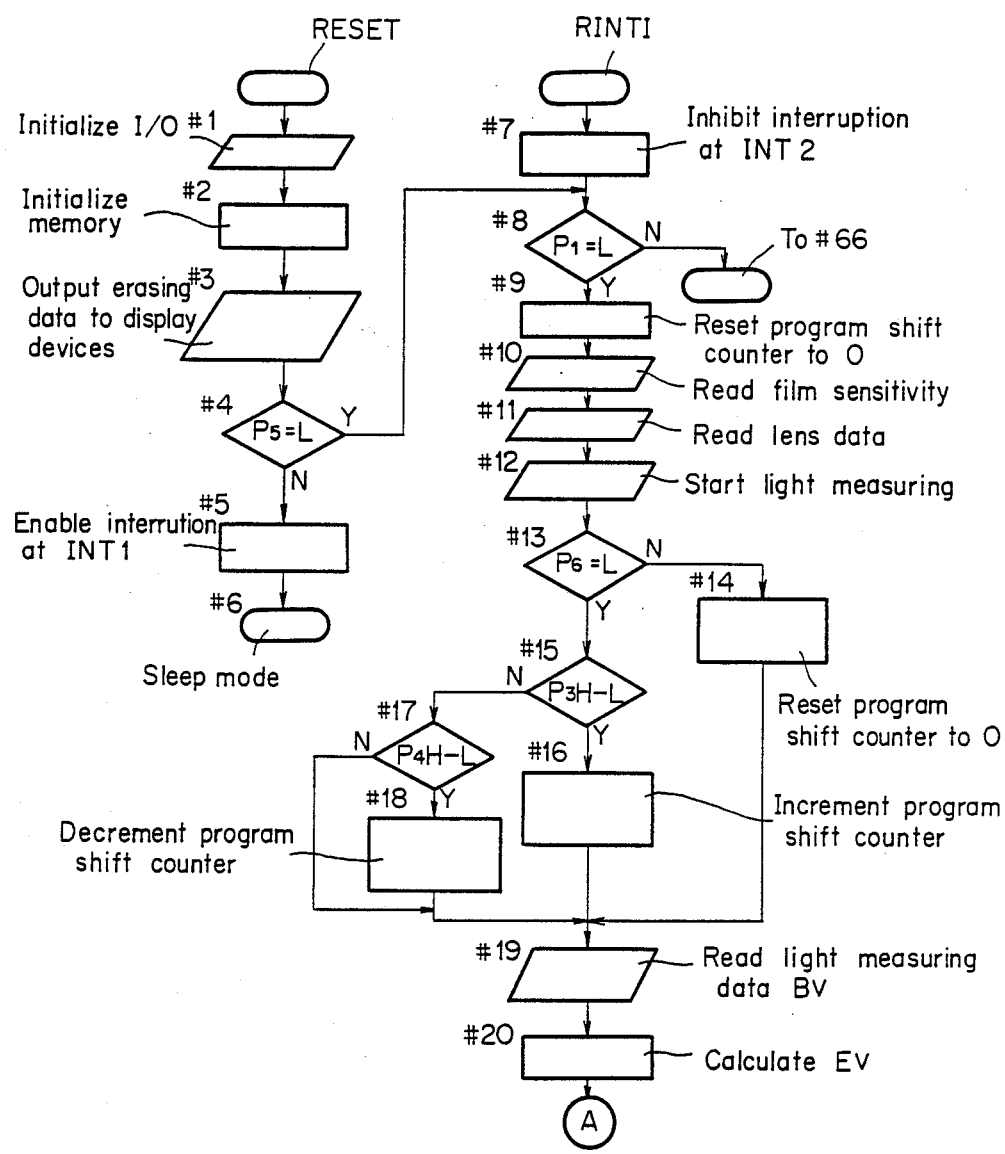
FIGS. 18a, 18b and 19a, 19b are flow charts illustrating operation of the camera of FIG. 14.

Referring first to FIG. 18a, upon leading of a power source is put into the camera, the CPU 1 starts the reset operation beginning from step #1. As a result of such resetting, the CPU 1 is thereafter prevented from any interruption. Thus, at step #1, the individual input/output terminals of the CPU 1 are initialized in order that no peripheral circuit may conduct any unnecessary operation. Then the sequence advances to step #2 at which internal registers or memory within the CPU 1 are initialized. Then at step #3, erasing data which instructs erasing entire indication of the LCD 7 is delivered to the display controller 6 in order to cause the LCD 7 to give no indication thereon. Subsequently, the sequence advances to step #4 at which a state of a port P5 of the CPU 1 is checked, and in case the port P5 is at the "H" level since the main switch SM is off, the sequence advances to step #5 at which interruption at the terminal INT1 which occurs when the main switch SM is turn from off to on is enabled. Thereafter, the sequence advances to step #6 at which the CPU 1 is put into a sleep mode. The sleep mode is a power save mode in which oscillation of internal clock of the CPU 1 stops and contents of the memory are maintained. From the sleep mode, the normal mode is re-entered when the CPU 1 is either interrupted or reset.

On the other hand, when the port P5 is in the "L" level state at step #4, the sequence advances to step #8. Meanwhile, if the main switch SM is turned from off to on when the CPU 1 is in the sleep mode into which it has been put at step #6, interruption of the CPU 1 at the terminal INT1 thereof occurs so that the sequence is transferred to step #7. At step #7, interruption at the terminal INT2 which occurs by movement of the barrier is inhibited. Subsequently, the sequence advances to step #8. Also when the port P5 is at the "L" level at step #4, the sequence advances to this step #8.

Figure 19A:
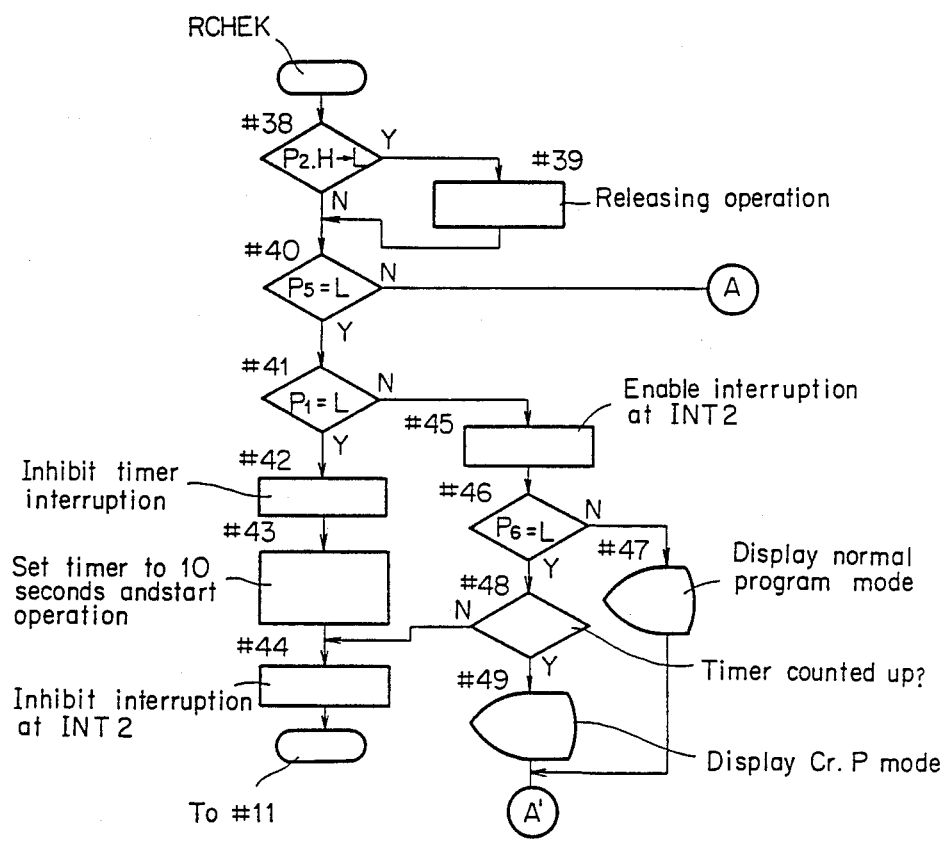
Figure 19B:
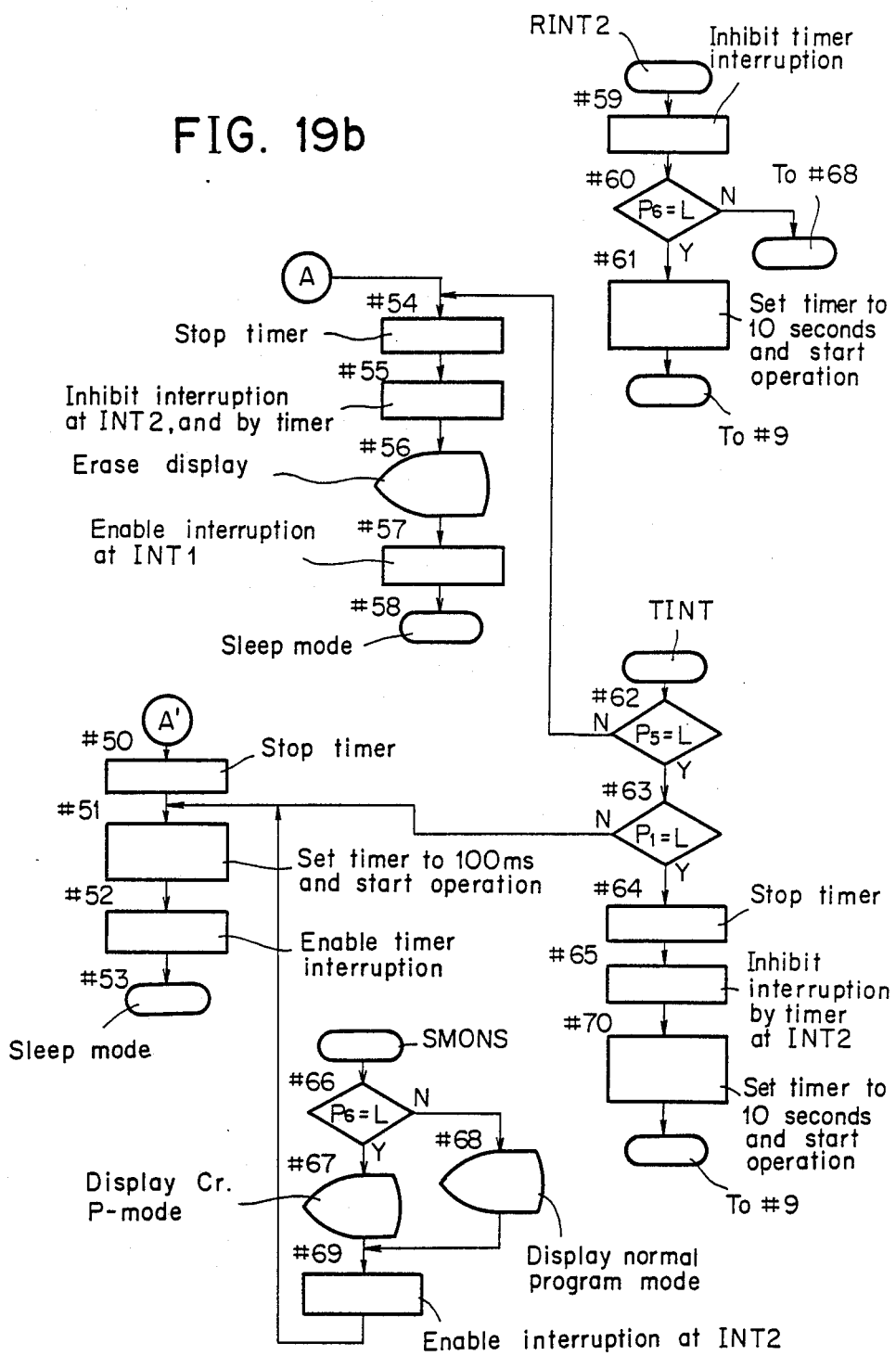

At step #8, a state of the port P1 is checked, and if the port P1 is at the "H" level since the switch S1 is off, the sequence advances to step #66 of FIG. 19b. On the contrary when the port P1 is at the "L" level since the switch S1 is on, the sequence advances to step #9. Here, description will first proceed with an assumption that the switch S1 is on and hence the sequence advances to step #9. At step #9, a program shift counter is reset to "0". The program shift counter is provided in a data memory of the CPU 1 and is used to indicate a shifted number for program shift which will be hereinafter described.

Subsequently, the sequence advances to step #10 at which a CAS code recorded on a film cartridge is read by the film sensitivity reader 5 and a data corresponding to a film sensitivity is taken into the CPU 1. Then at step #11, lens data such as a focal length, an open diaphragm aperture value, a minimum diameter diaphragm aperture value and so on of an interchangeable lens are taken into the CPU 1 from the lens ROM 2 provided within the interchangeable lens. After then, the sequence advances to step #12 at which the CPU 1 delivers a light measurement starting signal to the light measuring circuit 3 in order to start light measurement. Subsequently, the sequence advances to step #13 at which a state of the port P6 is checked, and if the port P6 is at the "H" level since the barrier is at the P position as shown in FIG. 15a, because the program up key and the program down key are covered by the barrier so that they cannot be operated by a user of the camera and hence program shifting is disabled, the sequence advances to step #14 at which the program shift counter is reset to "0". After then, the sequence advances to step #19.

On the other hand, if the port P6 of the CPU 1 is at the "L" level at step #13 since the barrier is at the Cr.P position as shown in FIG. 15b, the sequence advances to step #15 at which a state of the port P3 to which the switch SWU is connected is checked. In case the port P3 has changed from the "H" to the "L" level state, that is, when the program up key is depressed once, the sequence advances to step #16 at which the program shift counter is incremented by one, whereafter the sequence advances to step #19. Meanwhile, in case the port P3 continues its "H" or "L" level state, that is, when the program up key is not depressed or is held depressed, the sequence advances to step #17 without incrementing the program shift counter. At step #17, a state of the port P4 is checked similarly as at step #15, and in case the program down key is depressed once, the sequence advances to step #18 at which the program shift counter is decremented by one and then to step #19. On the contrary where the port P4 continues its "H" or "L" level state at step #17, the sequence advances to step #19 without decrementing the program shift counter because the program down key is not depressed or else is held depressed.

A step #19, a value Bv of light measurement data converted from an analog to a digital value is read into the CPU 1 from the light measuring circuit 3. Subsequently, the sequence advances to step #20 at which a value Ev (Ev=Sv+Bv) is calculated from the film sensitivity value Sv and the brightness value Bv and then to step #21 of FIG. 18b.

Figure 18B:
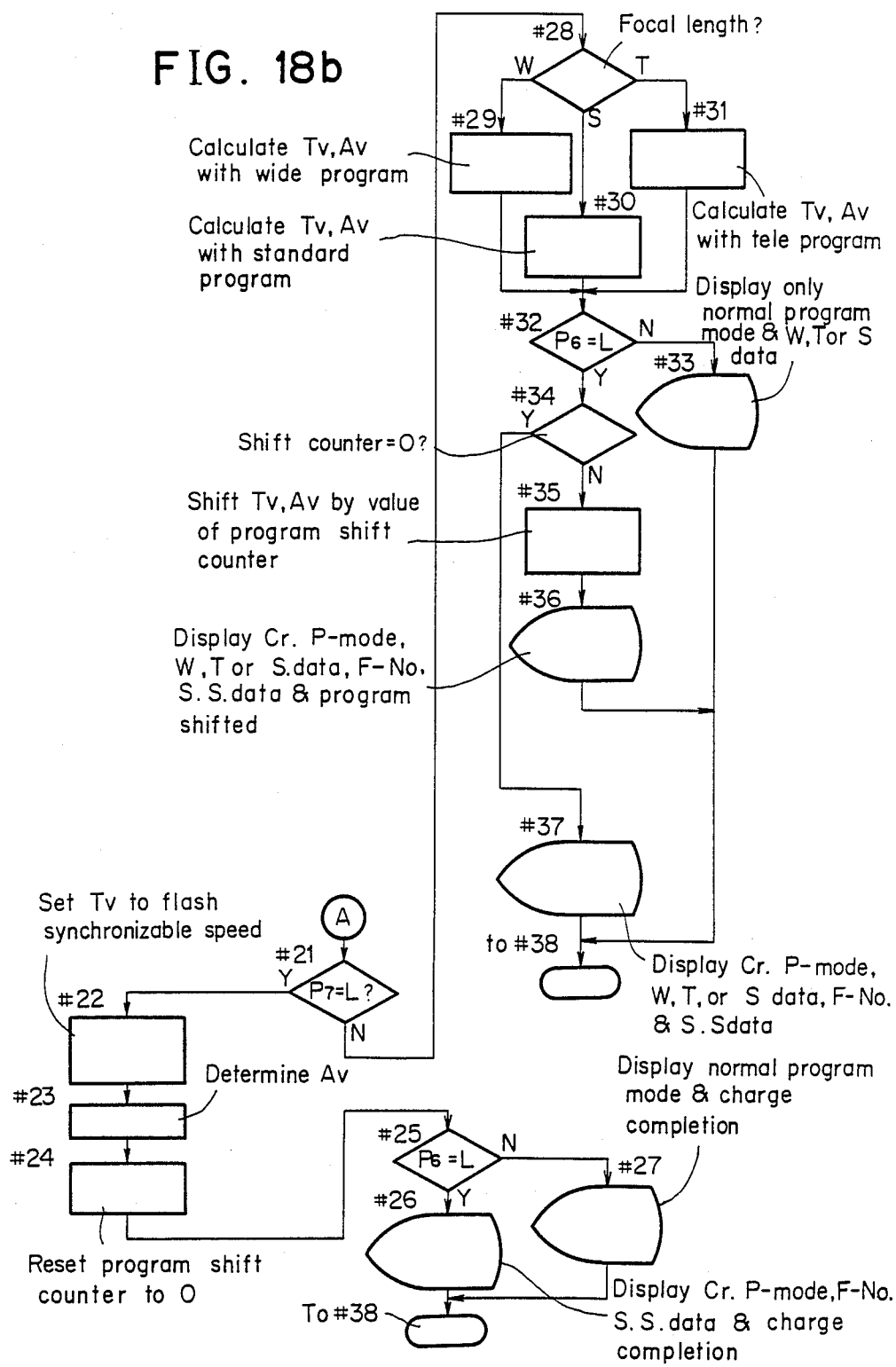

Referring to FIG. 18b, at step #21, a state of the port P7 is checked, and in case the port P7 is at the "L" level since the flash device 10a is in charging completion state, i.e., the charging of the main capacitor of the flash device 10a exceeding a given level, the sequence advances to a flash photography data determining sequence beginning with step #22. Thus, at first at step #22, a value Tv is made equal to a value corresponding to a synchronizable shutter speed, and then at step #23, a value Av is determined taking a brightness of an object into consideration. Then, the sequence advances to step #24 at which the program shift counter is reset to "0" to disable program shifting. Subsequently at step #25, a state of the port P6 is checked, and if the port P6 is at the "L" level since the barrier is at the Cr.P position, the sequence advances to step #26 at which the CPU 1 causes the display devices to make indications of "PROGRAM", "P" (1, 1' in FIGS. 16a, 16b, respectively) representing the program mode of the camera, "C" (2, 2' in FIGS. 16a, 16b, respectively) representing the Cr.P position of the barrier, the shutter speed and the diaphragm aperture value (6, 6' and 7, 7' in FIGS. 16a, 16b, respectively), and the mark (8 in FIG. 16b) representing completion of charging of the flash device 10a. To the contrary, in case the port P6 is at the "H" level at step #25 since the barrier is at the P position, the sequence advances to step #27 at which the CPU 1 causes the display devices to make indications only of "PROGRAM", "P" (1, 1' in FIGS. 16a, 16b, respectively) representing the program mode of the camera, and the mark (8 in FIG. 16b) representing completion of charging of the flash device 10a. Since a program executed at flash photography after the flash device 10 has been charged up differs from the ordinary programs, no indication is made of identification of a type of a program among wide, standard and tele. After the display data have been outputted at step #26 or #27, the seqeuence advances to step #38 of FIG. 19a.

On the other hand, in case the port P7 is at the "H" level at step #21 since the flash device 10a is not yet charged up, the sequence advances to step #28. At step #28, a focal length data of the lens read from the lens ROM 2 is checked to identify a program to executed. For example, in case the focal length f is smaller than 35 mm, the sequence advances to step #29, but in case the focal length f is equal to or greater than 35 mm and equal to or smaller than 100 mm, the sequence advances to step #30, but otherwise in case the focal length f is greater than 100 mm, the sequence advances to step #31. At step #29, values Tv, Av are calculated in accordance with the wide program. Meanwhile, at step #30, values Tv, Av are calculated in accordance with the standard program. On the other hand, at step #31, values Tv, Av are calculated in accordance with the tele program.

Figure 17:
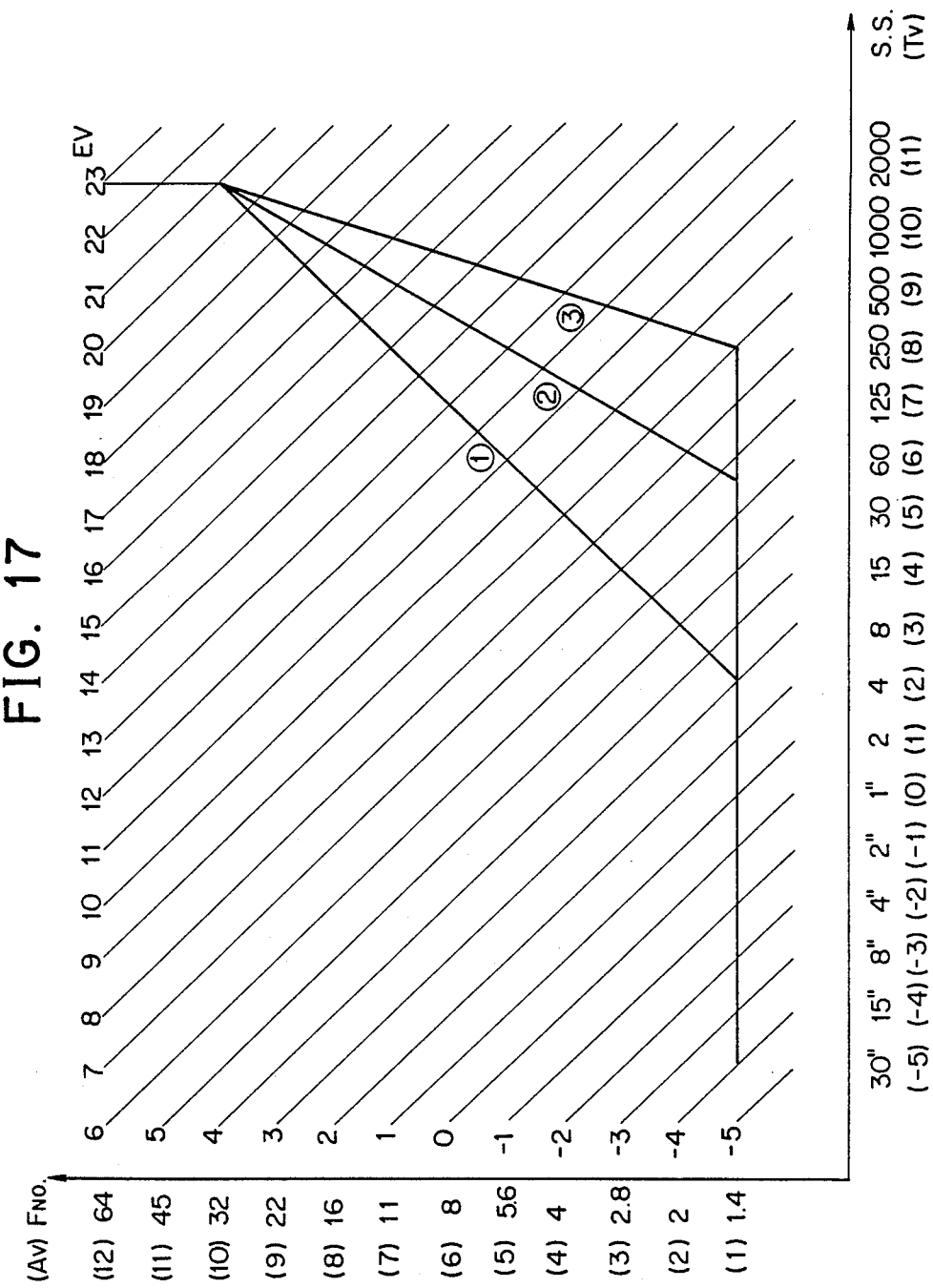
FIG. 17 is a diagram illustrating characteristics of a plurality of automatic exposure programs employed in the camera of FIG. 14.

Three program lines such as, for example, program lines ①, ②, ③ shown in FIG. 17 are prepared for the individual programs. In FIG. 17, the program line ① represents the wide program, the program line ② the standard program, and the program line ③ the tele program. All the three program lines are displaced in the high speed side taking the camera shake into consideration. After completion of the calculation of the values Tv, Av in any of the programs, the sequence advances to step #32 at which a state of the port P6 is checked, and in case the port P6 is at the "H" level since the barrier is at the P position, the sequence advances to step #33 at which the CPU 1 delivers data to the display devices so that the display devices may make indications of "PROGRAM", "P" (1, 1' in FIGS. 16a, 16b, respectively) repesenting the program mode of the camera, and one of character groups of "WIDE" (3, 3' in FIGS. 16a, 16b, respectively), "STD" (=standard) (4, 4' in FIGS. 16a, 16b, respectively) and "TELE" (5, 5' in FIGS. 16a, 16b, respectively) representing the selected program. After then, the sequence advances to step #38 of FIG. 19a.

In case the port P6 is otherwise at the "L" level at step #32 since the barrier is at the Cr.P position, the sequence advances to step #34 at which a value of the program shift counter is checked. In case the program shift counter contains a value "0", the sequence advances to step #37 without effecting program shifting. At step #37, the display devices are caused to make indications of "PROGRAM", "P" (1, 1' in FIGS. 16a, 16b, respectively) and "C" (2, 2' in FIGS. 16a, 16b, respectively) so as to indicate that the barrier is at the Cr. P position and also to make indications of "WIDE", "STD" or "TELE" representing a type of an individual program selected and also of the shutter speed and the diaphragm aperture value, whereafter the sequence advances to step #38 of FIG. 19a. On the other hand, in case the program shift counter contains a value other than "0" at step #34, the sequence advances to step #35 at which the program lines are shifted by a number corresponding to the value of the program shift counter. Such program shifting is effected by 0.5 Ev for count 1 in order to determine values Tv and Av.

Program shifting is effected when a user is dissatisfactory with a combination of a shutter speed and a diaphragm aperture value which ar determined by any of the normal programs and thus wants to obtain a combination of a necessary shutter speed or a necessary diaphragm aperture value. It is to be noted that in case a limit value of control in shutter speed and/or diaphragm aperture value is reached as a result of such program shifting, program shifting is not performed any more.

After completion of the program shifting, the sequence advances to step #36 at which the display devices are caused to make flickering indications of "PROGRAM", "P" (1, 1' in FIGS. 16a, 16b, respectively) representing that program shifting has been effected and to make indications of "C" (2, 2' in FIGS. 16a, 16b, respectively) representing that the barrier is at the Cr.P position, "WIDE", "STD" or "TELE" representing the selected program, and the shutter speed and the diaphragm aperture value. After then, the sequence advances to step #38 of FIG. 19a.

Referring now to FIG. 19a, at step #38, a state of the port P2 is checked, and in case the port P2 has been changed from the "H" to the "L" level state since the switch S1 has been turned on, the sequence advances to step #39 at which shutter releasing operation of the camera is performed. Here, the CPU 1 instructs the controller 4 to perform controlling of stop-down of the diaphragm aperture, upward movement of the mirror, actuation of the shutter and so on in order to effect required photographing. Further, when integrated value of the reflected light under flash light emission reaches a given level, the light measuring circuit 3 outputs a light emission stopping signal to the flash device 10a. After completion of the shutter releasing operation, the sequence advances to step #40. Also when the port P2 continues its "H" or "L" level state at step #38, the sequence advances to step #40.

At state of the port P5 is checked. Here, if it is assumed that the main switch SM is on and hence the port P5 is in the "L" level state, the sequence advances to step #41 at which a state of the port P1 is checked. In case the port P1 is at the "L" level since the switch S1 is on, the sequence advances to step #42 at which interruption by the built-in timer of the CPU 1 is inhibited, and when to step #43 at which the counting up time of the built-in timer is set to 10 seconds and operation of the timer is started. Then at step #44, interruption at the terminal INT2 by movement of the barrier is inhibited, and then the sequence returns to step #11 of FIG. 18a.

On the other hand, in case the port P1 is at the "H" level at step #41 since the switch S1 is off, the sequence advances to step #45 at which interruption at the terminal INT2 by movement of the barrier is enabled and then to step #46 at which a state of the port P6 is checked. Here, if the port P6 is at the "H" level since the barrier is at the P position, the sequence advances, without holding the power source, to step #47 at which the display devices are caused to make indications only of "PROGRAM", "P" (1, 1' of FIGS. 16a, 16b, respectively) of the normal program mode, whereafter the sequence advances to step #50 of FIG. 19b. Meanwhile, in case the port P6 is at the "L" level since the barrier is at the Cr.P position, the sequence advances to step #48 at which the timer is checked if the counting operation thereof has completed, and if it has not yet completed, this means that the power source is held. Consequently, the sequence returns to step #11 via step #44. If the counting operation of the timer has otherwise completed at step #48, this means that the holding of the power source has completed. Accordingly, the sequence advances to step #49. The period for such holding of the power source has been selected to be about 10 seconds. Then at step #49, the display devices are caused to make indications of "PROGRAM", "P" (1, 1' in FIGS. 16a, 16b, respectively) and "C" (2, 2' in FIGS. 16a, 16b, respectively) representing that the camera is in the creative program mode, whereafter the sequence advances to step #50 of FIG. 19b.

Referring to FIG. 19b, at step #50, the timer is stopped, and then at step #51, the counting up time of the timer is set to 100 ms and operation of the timer is started. In this instance, the timer is used for sampling to detect an off state of the main switch SM and an on state of the switch S1. Then at step #52, interruption by the timer is enabled, and at step #53, the CPU 1 enters the sleep mode.

In the meantime, in case the port P5 is at the "H" level at step #40 since the main switch SM is off, the sequence advances to step #54 of FIG. 19b at which the timer is stopped and then to step #55 at which interruption at the terminal INT2 by movement of the barrier and interruption by the timer are inhibited. Subsequently at step #56, all the indications are erased, and then at step #57, only interruption at the terminal INT1 by the main switch SM is enabled, whereafter the CPU 1 enters the sleep mode at step #58. In this condition, unless the main switch SM is not turned on, the camera will not start its operation, and when the main switch SM is turned on, interruption at the terminal INT1 occurs to the CPU 1 so that the sequence returns to step #7 again.

In case the sequence advances to step #66 from step #8 at which it is determined that the port P1 is at the "H" level since the switch S1 is off, a state of the port P6 is checked at step #66, and in case the port P6 is at the "L" level since the barrier is at the Cr.P position, the sequence advances to step #67 at which the display devices are caused to make indications of "PROGRAM", "P" (1, 1' in FIGS. 16a, 16b, respectively) and "C" (2, 2' in FIGS. 16a, 16b, respectively), whereafter the sequence advances to step #69. Meanwhile, in case the port P6 is at the "H" level at step #66 since the barrier is at the P position, the sequence advances to step #68 at which the display devices are caused to make indications only of "PROGRAM", "P" (1, 1' in FIGS. 16a, 16b, respectively), whereafter the sequence advances to step #69. At step #69, interruption at the terminal INT2 by movement of the barrier is enabled and then the sequence advances to the sequence beginning with step #51. During holding of the power source or while the CPU 1 is in the sleep mode entered at step #53, interruption at the terminal INT2 is enabled so that movement of the barrier in either direction from the Cr.P position to the P position or from the P position to the Cr.P position will cause interruption of the CPU 1 at the terminal INT2.

Upon interruption at the terminal INT2, the sequence of the program is transferred to step #59 at which interruption by the timer is inhibited. Subsequently at step #60, a state of the port P6 is checked, and in case the port P6 is at the "H" level since the barrier is at the P position, the sequence advances, without holding the power source, to a sequence beginning with step #68 in order to change indications by the display devices. On the contrary, when the port P6 is at the "L" level at step #60 since the barrier is at the Cr.P position, the sequence advances to step #61 at which the counting up time of the timer is set to 10 seconds for holding of the power source and operation of the timer is started, whereafter the sequence advances to step #9 of FIG. 18a.

On the other hand, in case the CPU 1 enters the sleep mode at step #53, if timer interruption occurs due to lapse of a time of 100 ms, the sequence advances to step #62 at which a state of the port P5 is checked, and in case the port P5 is at the "H" level since the main switch SM is off, the sequence advances to the sequence beginning with step #54 in order to repeat the similar operation as described above. On the contrary if it is determined at step #62 that the main switch SM is on, the sequence advances to step #63 at which the port P1 is checked. Here, if the switch S1 is off since the port P1 is at the "H" level, the sequence advances to step #51 so that the sleep mode for a period of time of 100 ms may be entered again. On the other hand, if the switch S1 is on since the port P1 is at the "L" level at step #63, then the timer is stopped at step #64, and then at step #65, interruption by the timer and interruption at the terminal INT2 are inhibited. After then, the counting up time of the timer is set to 10 seconds at step #70 and operation of the timer is started, and then the sequence returns to step #9 of FIG. 18a in order to repeat the sequence described above.

Now, a further embodiment of the invention will be described wherein a key for changing over between a program mode and a manual mode is exposed by movement of a barrier to its open position. In this instance, when the barrier is in a closed position, one of wide, standard and tele programs of normal program is automatically selected in response to a focal length of a lens. On the contrary, if the barrier is moved to its open position, the normal program mode and the manual mode are alternately changed over by each operation of a mode selection key, and where the manual mode is selected, an exposure time is determined by operation of any of an up key and a down key and a diaphragm aperture value is determined by operation of any of another up key and another down key provided at a lens mounting section of the camera.

Figure 21:
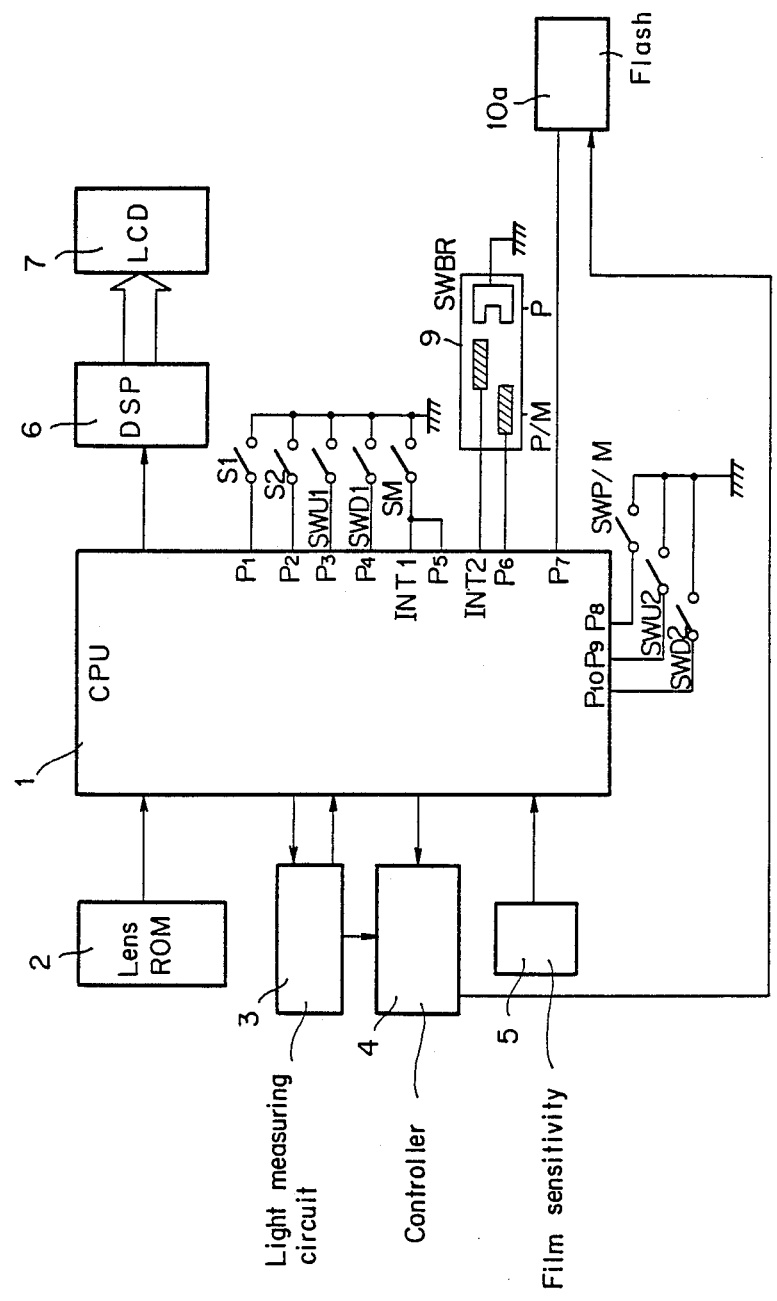

FIG. 21 is a block circuit diagram showing entire construction of the embodiment. The circuit shown includes a switch SWU1 for changing a value Tv toward the up side when the camera is in the manual mode, and another switch SWD1 for changing a value Tv toward the down side similarly when the camera is in the manual mode. Besides, the circuit includes a switch SWU2 for changing a value Av toward the up side when the camera is in the manual mode, and another switch SWD2 for changing a value Av toward the down side when the camera is in the manual mode. The circuit additionally includes a mode selection switch SWP/M for changing over the camera between the program mode and the manual mode. The circuit shown is similar in construction to the circuit of FIG. 14 except for the elements described just above, and hence further description of the same is omitted herein.

Figure 20A:
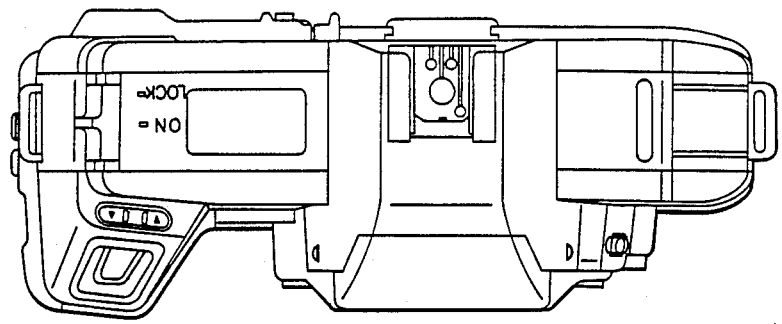
FIGS. 20a and 20b are plan views and FIG. 20c is a front elevational view, all showing a camera according to a further embodiment of the invention.
Figure 20B:
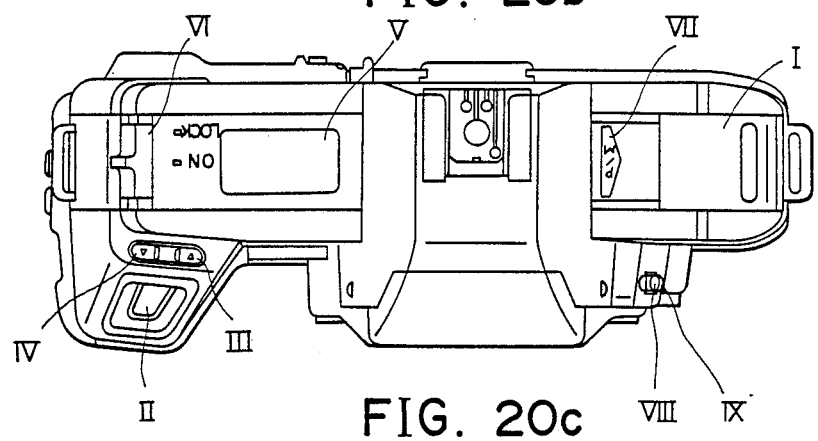
Figure 20C:
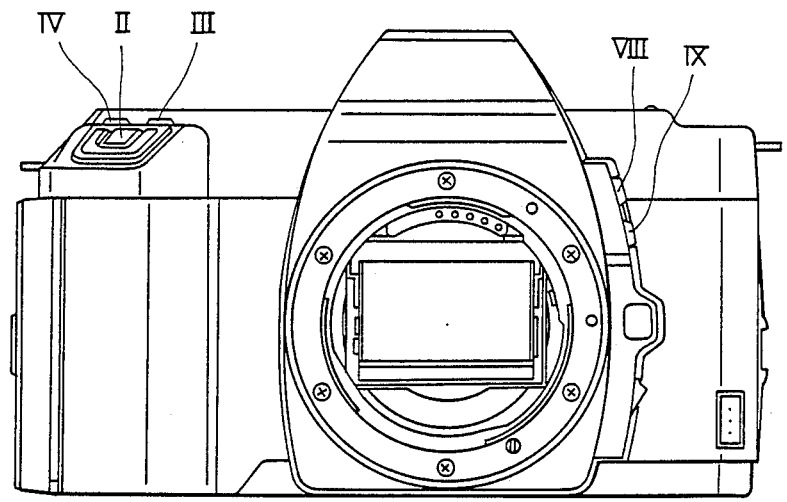

FIGS. 20a and 20b show plan views and FIG. 20c shows a front elevational view of the camera according to the present embodiment of the invention. Referring to FIGS. 20a to 20c, the camera includes a barrier I which cooperates with the barrier switch described hereinabove. The barrier has two positions including a closed position as shown in FIG. 20a and an open position as shown in FIG. 20b. At the open position of the barrier I, a mode selection key VII is exposed outside to allow a photographing mode to be changed. The mode selection key VII cooperates with the mode selection switch SWP/M. Meanwhile, an up key IV and a down key III are located on the top of the camera and are exposed outside. The up key IV cooperates with the switch SWU1, and the down key III cooperates with the switch SWD1.

As seen in FIG. 20c, the camera further includes another up key VIII and another down key IX located on a side face of a lens mounting section thereof. The up key VIII cooperates with the switch SWU2, and the down key IX cooperates with the switch SWD2. The camera further includes a release button II, a main switch VI', and a display window V which allows indications by the LCD 7 to be observed from the outside.

Figure 24A:
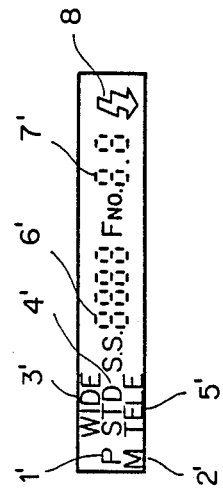
Figure 24B:
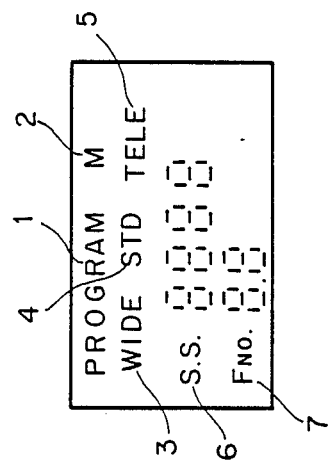

FIGS. 24a and 24b illustrate all display segments to be displayed by the LCD 7. In particular, FIG. 24a illustrates indications on a body of the camera, and FIG. 24b illustrates indications within the finder. In FIGS. 24a and 24b, display characters 2, 2' represent that the camera is in the manual mode. The other indications of the display devices are similar to those of the proceding embodiment of FIGS. 16a, 16b, and hence description of the other indications will be omitted herein.

Now, operation of the camera according to the present embodiment of the invention will be described with reference to flow charts shown in FIGS. 22a, 22b and 23a, 23b.

Figure 22A:
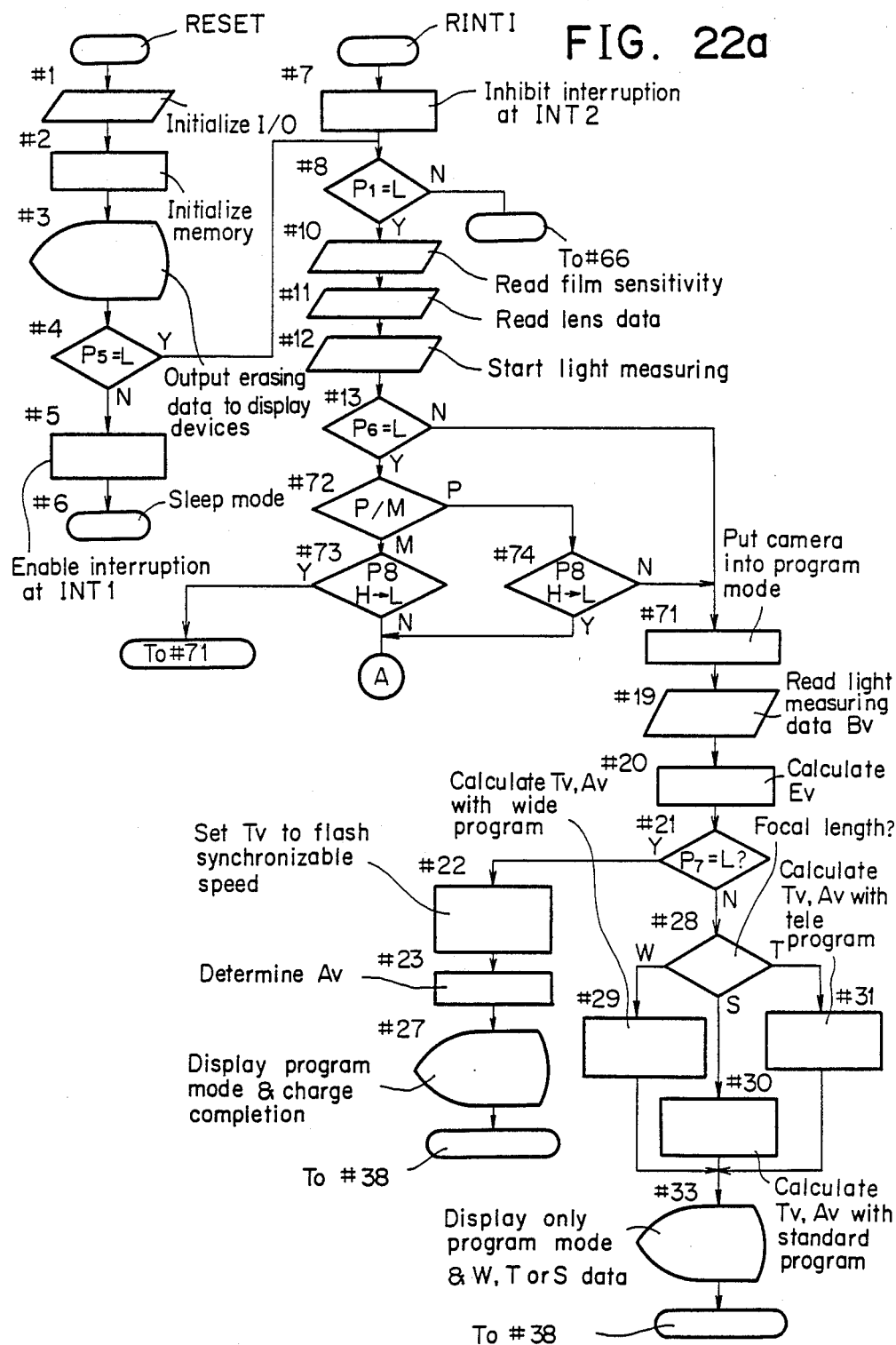

Referring first to FIG. 22a, if at first a power source is put into the camera, the CPU 1 starts reset routine beginning is with step #1. As a result of such resetting, the CPU 1 is thereafter prevented from any interruption. Thus, at step #1, the individual input/output terminals of the CPU 1 are initialized in order that no peripheral circuit may conduct any unnecessary operation. Then the sequence advances to step #2 at which internal registers or memory within the CPU 1 are initialized. Then at step #3, erasing data which instructs erasing entire indication of the LCD 7 is delivered to the display controller 6 in order to cause the LCD 7 to give no indication thereon. Subsequently, the sequence advances to step #4 at which a state of a port P5 of the CPU 1 is checked, and in case the port P5 is at the "H" level since the main switch SM is off, the sequence advances to step #5 at which interruption at the terminal INT1 which occurs when the main switch SM is turn from off to on is enabled. Thereafter, the sequence advances to step #6 at which the CPU 1 is put into a sleep mode. The sleep mode is a power save mode in which oscillation of internal clock of the CPU 1 stops and contents of the memory are maintained. From the sleep mode, the normal mode is re-entered when the CPU 1 is either interrupted or reset.

On the other hand, when the port P5 is in the "L" level state at step #4, the sequence advances to step #8. Meanwhile, if the main switch SM is turned from off to on when the CPU 1 is in the sleep mode into which it has been put at step #6, interruption of the CPU 1 at the terminal INT1 thereof occurs so that the sequence is transferred to step #7. At step #7, interruption at the terminal INT2 which occurs by movement of the barrier is inhibited. Subsequently, the sequence advances to step #8. Also when the port P5 is at the "L" level at step #4, the sequence advances to this step #8.

Figure 23A:
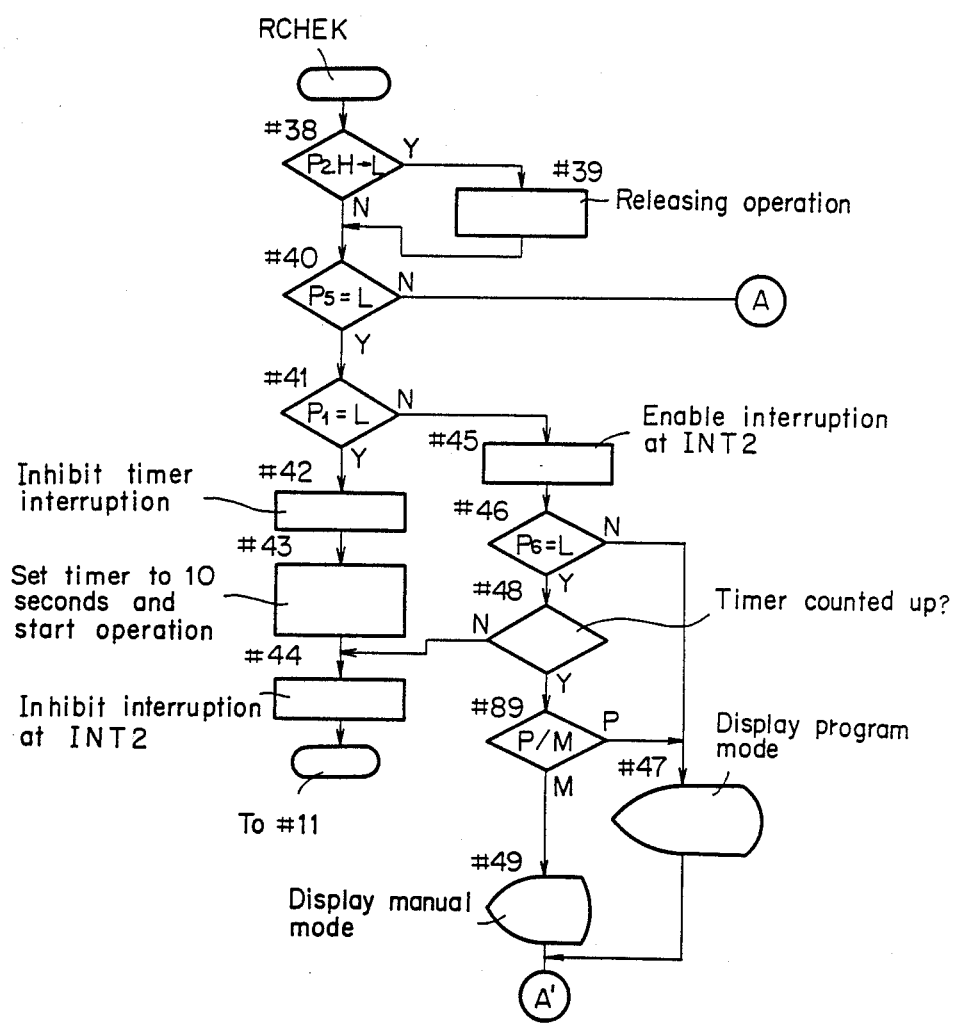
Figure 23B:
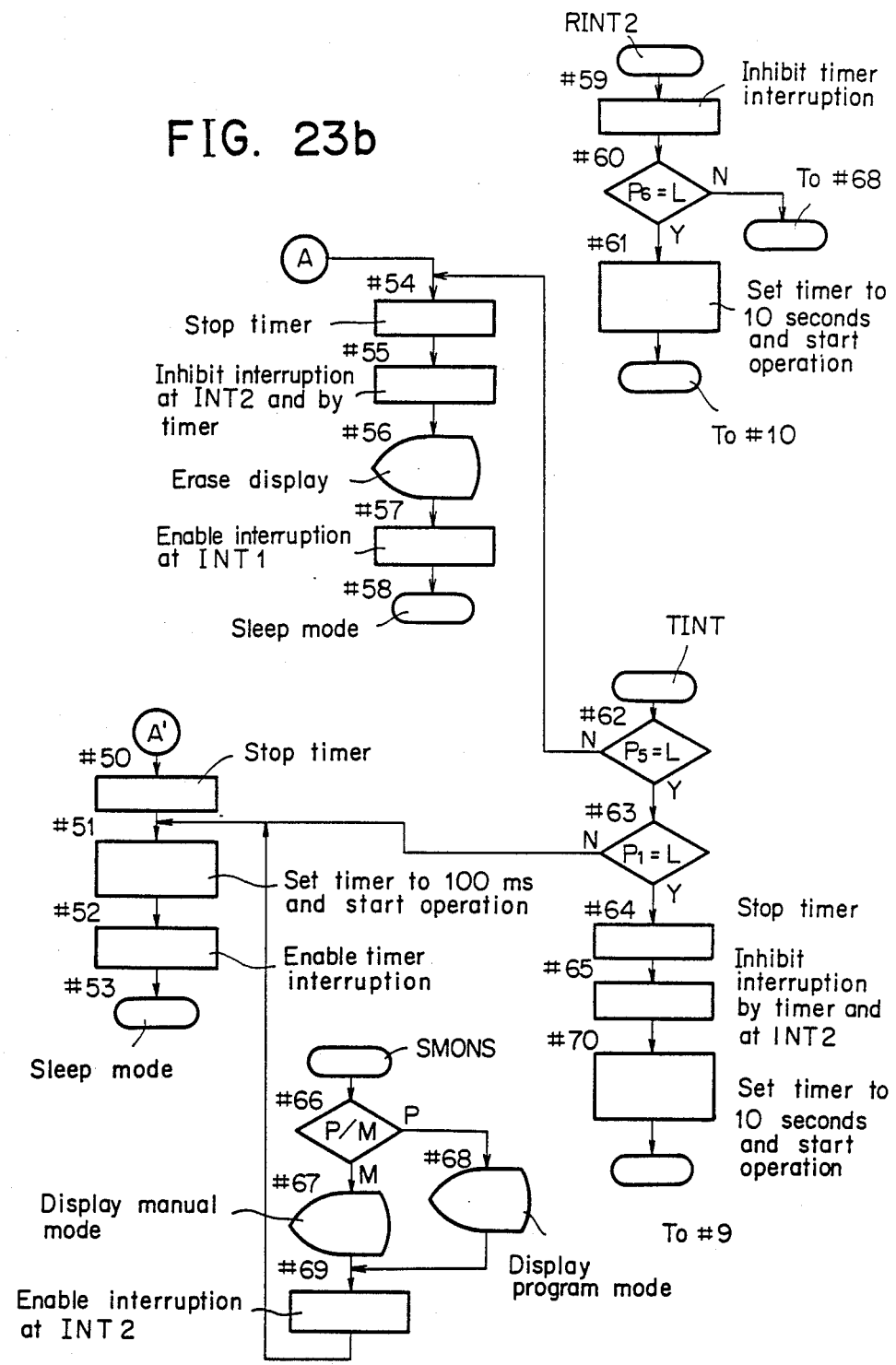

At step #8, a state of the port P1 is checked, and if the port P1 is at the "H" level since the switch S1 is off, the sequence advances to step #66 of FIG. 23b. On the contrary when the port P1 is at the "L" level since the switch S1 is on, the sequence advances to step #10. Here, description will first proceed with an assumption that the switch S1 is on and hence the sequence advances to step #10.

At step #10, a CAS code recorded on a film cartridge is read by the film sensitivity reader 5 and a data corresponding to a film sensitivity is taken into the CPU 1. Then at step #11, lens data such as a focal length, an open diaphragm aperture value, a minimum diameter diaphragm aperture value and so on of an interchangeable lens are taken into the CPU 1 from the lens ROM 2 provided within the interchangeable lens. After then, the sequence advances to step #12 at which the CPU 1 delivers a light measurement starting signal to the light measuring circuit 3 in order to start light measurement. Subsequently, the sequence advances to step #13 at which a state of the port P6 is checked, and if the port P6 is at the "H" level since the barrier is at the closed position as shown in FIG. 20a, because the mode selection key is covered by the barrier so that it cannot be operated by a user of the camera and hence it is impossible to change the present photographing mode, the sequence advances to step #71 at which the camera is set into the program mode. After then, the sequence advances to step #19.

On the contrary, when the port P6 is at the "L" level at step #13 since the barrier is at the open position as shown in FIG. 20b, the program advances to step #72 at which the present mode is discriminated because changing of the photographing mode is allowed.

In case the camera is in the manual mode at present at step #72, the sequence advances to step #73 at which a state of the port P8 to which the mode selection switch SWP/M is connected is checked, and if the port P8 has changed from the "H" to the ""L" level state, that is, in case the mode selection key has been depressed once, the sequence advances to step #71 at which the camera is put into the program mode. On the contrary, in case the mode selection key is not yet depressed at step #73, the sequence advances to step #75 of FIG. 22b at which the camera is put into the manual mode.

Figure 22B:
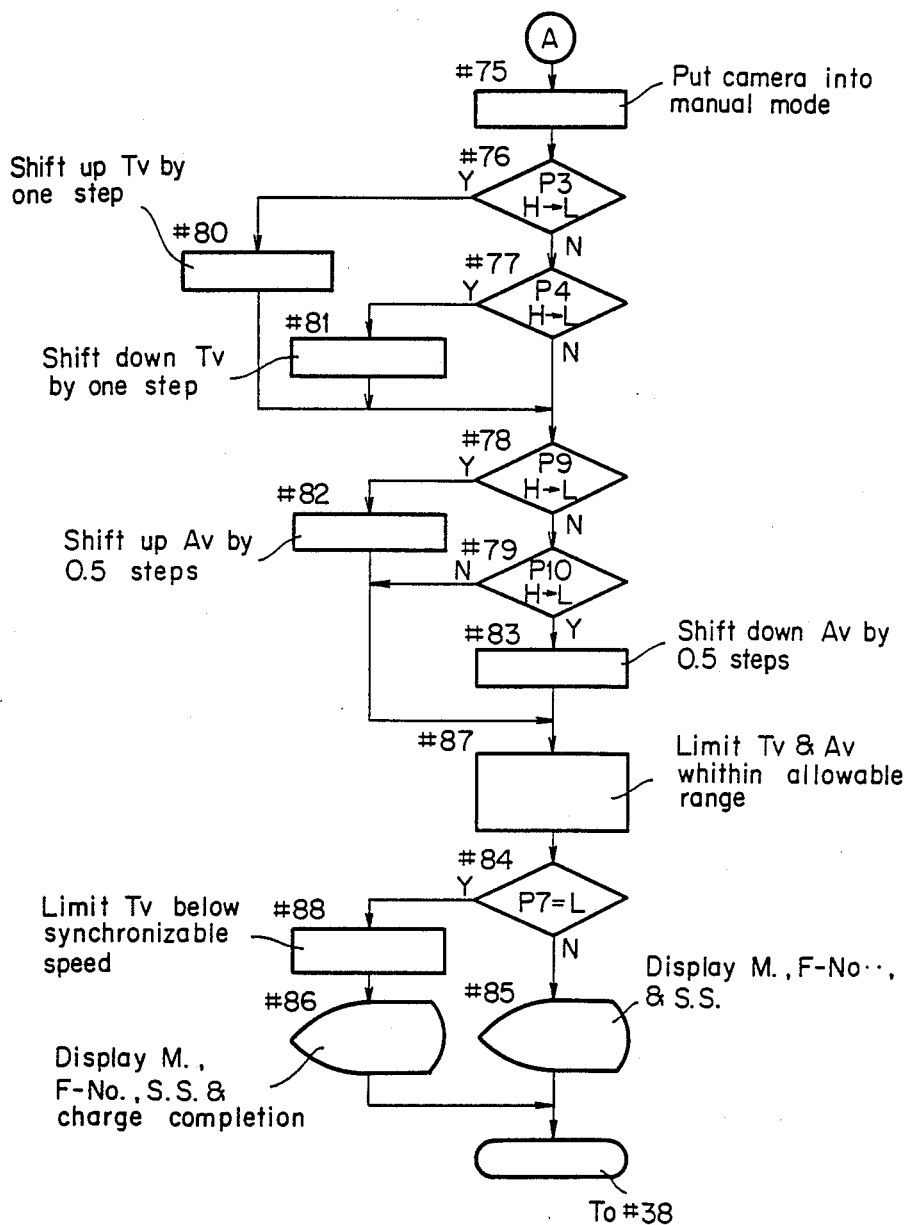

Meanwhile, in case the present mode of the camera is the program mode at step #72, the sequence advances to step #74 also at which a state of the port P8 is checked to determine if the mode selection key has been depressed once, and if the determination here is affirmative, then the sequence advances to step #75 of FIG. 22b at which the camera is put into the manual mode, but otherwise if it is determined at step #74 that the mode selection key is not yet depressed, the sequence advances to step #71 at which the camera is put into the program mode. Referring now to FIG. 22b, in case the camera is put into the manual mode at step #75, the sequence advances to step #76 at which a state of the port P3 to which the switch SWU1 is connected is checked. Thus, if the port P3 has changed from the "H" to the "L" level state, that is, if the up key IV has been depressed once the sequence advances to step #80 at which the value Tv is shifted up by one step. After then, the sequence advances to step #78. Meanwhile, if the port P3 continues the "H" or the "L" level state at step #76, that is, either where the up key IV has not been depressed or where it is held depressed, the sequence advances to step #77 without shifting up the value Tv. At step #77, state of the port P4 is checked similarly as at step #76, and in case the down key III has been depressed once, the sequence advances to step #81 at which the value Tv is shifted down by one step, whereafter the sequence advances to step #78. On the other hand, in case the port P4 continues the "H" or the "L" level state at step #77, this means either that the down key III has not been depressed or that it is kept depressed, and accordingly the sequence advances to step #78 without shifting down the value Tv.

At step #78, a state of the port P9 to which the switch SWU2 is connected is checked. In case the port P9 has changed from the "H" to the "L" level state, that is, in case the up key VIII has been depressed once, the sequence advances to step #82 at which the value Av is shifted up by 0.5 steps. After then, the sequence advances to step #87. Meanwhile, in case the port P9 continues the "H" or the "L" level state at step #78, that is, in case the up key VIII has not been depressed or is kept depressed, the sequence advances to step #79 without shifting up the value Av.

At step #79, a state of the port P10 is checked similarly as at step #78, and in case the down key IX has been depressed once, the sequence advances to step #83 at which the value Av is shifted down by 0.5 steps and then to step #87. To the contrary, in case the port P10 continues the "H" or the "L" level state at step #79, this means that the down key IX has not been depressed or else is kept depressed, and accordingly the sequence advances to step #87 without shifting down the value Av.

At step #87, the manually determined values Tv and Av are limited within an allowable range. In particular, the determined value Tv is limited so that it may be within a range between a maximum controllable time value Tv max and a minimum controllable time value Tv min while the value Av is limited so that it may be within a controllable range between an open diaphragm aperture value and a minimum diameter diaphragm aperture value of the interchangeable lens. Subsequently, the sequence advances to step #84.

At step #84, a state of the port P7 is checked, and in case the port P7 is at the "L" level since the flash device 10a has been already charged up, the sequence advances to step #88 at which the determined value Tv is limited to a value lower than a value Tv corresponding to a synchronizable shutter speed, whereafter the sequence advances to step #86. At step #86, the display devices are caused to make indications of "M" (2, 2' in FIGS. 24a, 24b, respectively) representing that the camera is in the manual mode, the shutter speed and the diaphragm aperture value (6, 6' and 7, 7' in FIGS. 24a, 24b, respectively), and the mark (8 in FIG. 24b) representing that the flash device 10a has been charged up. After then, the sequence advances to step #38 of FIG. 23a.

In the meantime, in case the port P7 is at the "H" level at step #84 since the flash device 10a has not yet been charged up, the display devices are caused at step #85 to make indications only of "M", and the shutter speed and the diaphragm aperture value, whereafter the sequence advances to step #38 of FIG. 23a.

Referring again to FIG. 22a, in case the camera is put into the program mode at step #71 as described above the sequence advances to step #19.

At step #19, a value Bv of light measurement data converted from an analog to a digital value is read into the CPU 1 from the light measuring circuit 3. Subsequently, the sequence advances to step #20 at which a value Ev (Ev=Sv+Bv) is calculated from the film sensitivity value Sv and the brightness value Bv and then to step #21.

At step #21, a state of the port P7 is checked, and in case the port P7 is at the "L" level since the flash device 10a is in its charged up state, the sequence advances to a flash photography data determining sequence beginning with step #22. Thus, at first at step #22, a shutter speed value Tv is made equal to a value corresponding to a synchronizable shutter speed, and then at step #23, an aperture value Av is determined taking a brightness of an object into consideration. Then, the sequence advances to step #27 at which the CPU 1 causes the display devices to make indications of PPROGRAM", "P" (1, 1' in FIGS. 24a, 24b, respectively) representing the program mode of the camera, and the mark (8 in FIG. 24b) representing completion of charging of the flash device 10a. Since a program executed at flash photography after the flash device 10 has been charged up differs from the ordinary programs, no indication is made of identification of a type of a program among wide, standard and tele. After the display data have been outputted at step #27, the sequence advances to step #38 of FIG. 23a.

On the other hand, in case the port P7 is at the "H" level at step #21 since the flash device 10a is not yet charged up, the sequence advances to step #28. At step #28, a focal length data of the lens read from the lens ROM 2 is checked to identify a program to be executed. For example, in case the focal length f is smaller than 35 mm, the sequence advances to step #29, but in case the focal length f is equal to or greater than 35 mm and equal to or smaller than 100 mm, the sequence advances to step #30, but otherwise in case the focal length f is greater than 100 mm, the sequence advances to step #31. At step #29, values Tv, Av are calculated in accordance with the wide program. Meanwhile, at step #30, values Tv, Av are calculated in accordance with the standard program. On the other hand, at step #31, values Tv, Av are calculated in accordance with the tele program.

Three program lines such as, for example, program lines ①, ②, ③ shown in FIG. 17 are prepared for the individual programs similarly as in the preceding embodiment described hereinabove. After completion of the calculation of the values Tv, Av in any of the programs, the sequence advances to step #33 at which the CPU 1 delivers data to the display devices so that the display devices may make indications of "PROGRAM", "P" (1, 1' in FIGS. 24a, 24b, respectively) representing the program mode of the camera, and one of character groups of "WIDE" (3, 3' in FIGS. 24a, 24b, respectively), "STD" (=standard) (4, 4' in FIGS. 24a, 24b, respectively) and "TELE" (5, 5' in FIGS. 24a, 24b, respectively) representing the selected program. After then, the sequence advances to step #38 of FIG. 23a.

Referring now to FIG. 23a, at step #38, a state of the port P2 is checked, and in case the port P2 has been changed from the "H" to the "L" level state since the switch 2 has been turned on, the sequence advances to step #39 at which shutter releasing operation of the camera is performed. Here, the CPU 1 instructs the controller 4 to perform controlling of stop-down of the diaphragm aperture, upward movement of a mirror, actuation of the shutter and so on in order to effect required photographing. Further, when integrated value of the reflected light under flash light emission reaches a given level, the light measuring circuit 3 outputs a light emission stopping signal to the flash device 10a. After completion of the shutter releasing operation, the sequence advances to step #40. Also when the port P2 continues its "H" or "L" level state at step #38, the sequence advances to step #40.

At step #40, a state of the port P5 is checked. Here, if it is assumed that the main switch SM is on and hence the port P5 is in the "L" level state, the sequence advances to step #41 at which a state of the port P1 is checked. In case the port P1 is at the "L" level since the switch S1 is on, the sequence advances to step #42 at which interruption by the built-in timer of the CPU 1 is inhibited, and then to step #43 at which the counting up time of the built-in timer is set to 10 seconds and operation of the timer is started. Then at step #44, interruption at the terminal INT2 by movement of the barrier is inhibited, and then the sequence returns to step #11 of FIG. 22a.

On the other hand, in case the port P1 is at the "H" level at step #41 since the switch S1 is off, the program advances to step #45 at which interruption at the terminal INT2 by movement of the barrier is enabled and then to step #46 at which a state of the port P6 is checked. Here, if the port P6 is at the "H" level since the barrier is at the closed position, the sequence advances, without holding the power source, to step #47 at which the display devices are caused to make indications only a "PROGRAM", "P" (1, 1' of FIGS. 24a, 24b, respectively) representing the program mode of the camera, whereafter the sequence advances to step #50 of FIG. 23b. Meanwhile, in case the port P6 is at the "L" level since the barrier is at the open position, the sequence advances to step #48 at which the timer is checked if the counting operation thereof has completed, and if it has not yet completed, this means that the power source is held. Consequently, the sequence returns to step #11 via step #44. If the counting operation of the timer has otherwise completed at step #48, this means that the holding of the power source has completed. Accordingly, the sequence advances to step #89. The period for such holding of the power source has been selected to be about 10 seconds. Then at step #89, the present mode is discriminated, and in case the camera is in the program mode, the sequence advances to step #47 at which the program mode is displayed by the display devices and then to step #50 of FIG. 23b, but on the contrary where the camera is in the manual mode at step #89, the sequence advances to step #49. At step #49, the display devices are thus caused to make indications of "M" (2, 2' in FIGS. 24a, 24b, respectively) representing that the camera is in the manual mode, whereafter the sequence advances to step #50 of FIG. 23b.

Referring now to FIG. 23b, at step #50, the timer is stopped, and then at step #51, the counting up time of the timer is set to 100 ms and operation of the timer is started. In this instance, the timer is used for sampling to detect an off state of the main switch SM and an on state of the switch S1. Then at step #52, interruption by the timer is enabled, and at step #53, the CPU 1 enters the sleep mode.

In the meantime, in case the port P5 is at the "H" level at step #40 since the main switch SM is off, the sequence advances to step #54 of FIG. 23b at which the timer is stopped and then to step #55 at which interruption at the terminal INT2 by movement of the barrier and interruption by the timer are inhibited. Subsequently at step #56, all the indications are erased, and then at step #57, only interruption at the terminal INT1 by the main switch SM is enabled, whereafter the CPU 1 enters the sleep mode at step #58. In this condition, unless the main switch SM is not turned on, the camera will not start its operation, and when the main switch SM is turned on, interruption at the terminal INT1 occurs to the CPU 1 so that the sequence returns to step #7 again.

In case the sequence advances to step #66 from step #8 at which it is determined that the port P1 is at the "H" level since the switch S1 is off, the present mode is discriminated at step #66, and if the camera is in the manual mode, the sequence advances to step #67 at which the display devices are caused to make indications of "M" (2, 2' in FIGS. 24a, 24b, respectively), whereafter the sequence advances to step #69. Meanwhile, in case it is determined at step #66 that the camera is in the program mode, the sequence advances to step #68 at which the display devices are caused to make indications only of "PROGRAM", "P" (1, 1' in FIGS. 24a, 24b, respectively), whereafter the sequences to step #69. At step #69, interruption at the terminal INT2 by movement of the barrier is enabled and then the sequence advances to the sequence beginning with step #51. During holding of the power source or while the CPU 1 is in the sleep mode entered at step #53, interruption at the terminal INT2 is enabled so that movement of the barrier in either direction from the open position to the closed position or from the closed position to the open position will cause interruption of the CPU 1 at the terminal INT2.

Upon interruption at the terminal INT2, the sequence of the program is transferred to step #59 at which interruption by the timer is inhibited. Subsequently at step #60, a state of the port P6 is checked, and in case the port P6 is at the "H" level since the barrier is at the closed position, the sequence advances, without holding the power source, to a sequence beginning with step #68 in order to change indications by the display devices. On the contrary, when the port P6 is at the "L" level at step #60 since the barrier is at the open position, the sequence advances to step #61 at which the counting up time of the timer is set to 10 seconds for holding of the power source and operation of the timer is started, whereafter the sequence advances to step #10 of FIG. 22a.

On the other hand, in case the CPU 1 enters the sleep mode at step #53, if timer interruption occurs due to lapse of a time of 100 ms, the sequence advances to step #62 at which a state of the port P5 is checked, and in case the port P5 is at the "H" level since the main switch SM is off, the sequence advances to the sequence beginning with step #54 in order to repeat the similar operation as described above. On the contrary if it is determined at step #62 that the main switch SM is on, the sequence advances to step #63 at which the port P1 is checked. Here, if the switch S1 is off since the port P1 is at the "H" level, the sequence advances to step #51 so that the sleep mode for a period of time of 100 ms may be entered again. On the other hand, if the switch S1 is on since the port P1 is at the "L" level at step #63, then the timer is stopped at step #64, and then at step #65, interruption by the timer and interruption at the terminal INT2 are inhibited. After then, the counting up time of the timer is set to 10 seconds at step #70 and operation of the timer is started, and then the sequence returns to step #10 of FIG. 22a in order to repeat the sequence described above.

What is claimed is:

1. A camera comprising:
    a member that is manually operable in accordance with the intention of a photographer on exposure;
    a barrier mounted for movement between an open position in which said operable member is exposed to allow operation of said operable member and a closed position in which said barrier covers said operable member to prevent operation of said operable member; and
    controlling means for selecting an exposure controlling mode in whch the intention of the photographer is not reflected on exposure when said barrier is in the closed position and for enabling selection of another exposure controlling mode in which the intention of the photographer is reflected on exposure by operation of said operable member when said barrier is in the open position.

2. A camera according to claim 1, wherein the exposure controlling mode in which the intention of the photographer is reflected on exposure is a controlling mode in which one of a plurality of exposure program lines is selected by operation of said operable member.

3. A camera according to claim 1, wherein the exposure controlling mode in which the intention of the photographer is not reflected on exposure is a program mode in which no manual operation of said operable member is required for determination of exposure while the exposure controlling mode in which the intention of the photographer is reflected on exposure is a mode in which an exposure program line of the program mode in which the intention of the photographer is not reflected on exposure is shifted in a parallel relationship maintaining equal exposure value.

4. A camera according to claim 1, wherein the exposure controlling mode in which the intention of the photographer is not reflected on exposure is a program mode in which no manual operation of said operable member is required for determination of exposure while the exposure controlling mode in which the intention of the photographer is reflected on exposure is a mode in which exposure can be determined by operation of said operable member.

5. A camera according to claim 1, further comprising a display device for displaying exposure controlling data thereon, and display controlling means for rendering said display device inoperative when said barrier is in the closed position and for rendering said display device operative when said barrier is in the open position.

6. A camera according to claim 1, further comprising a shutter release button, a light measuring circuit, power supply means for supplying electric power to said light measuring circuit when said shutter release button is operated, timer means for causing said power supply means to continue its power supplying operation for a predetermined period of time after releasing of the operation of said shutter release button, and timer controlling means for rendering said timer means inoperative when said barrier is in the closed position and for rendering said timer means operative when said barrier is in the open position.

7. A camera according to claim 1, further comprising warning means for providing a warning when an exposure controlling time is longer than a predetermined time, and warning controlling means for rendering said warning means inoperative when said barrier is in the closed position and for rendering said warning means operative when said barrier is in the open position.

8. A camera, comprising:
    a member that is manually operable in accordance with the intention of a photographer on exposure;
    a barrier mounted for movement between a first position in which said operable member is exposed to allow operation of said operable member, a second position and a third position in which said barrier covers said operable member to prevent operation of said operable member; and
    camera operation controlling means for enabling an exposure controlling operation of said camera when said barrier is in the first or second position and for disabling the exposure controlling operation of said camera when said barrier is in the third position.

9. A camera according to claim 8, wherein said camera operation controlling means enables selection of an exposure controlling mode in which intention of a photographer is reflected on exposure by operation of said operable member when said barrier is in the first position, and when said barrier is in the second position, said camera operation controlling means selects another exposure controlling mode in which the intention of the photographer is not reflected on exposure.

10. A camera, comprising:
    a manually operable member; a barrier for covering and uncovering said operable member and having at least two designated positions and mounted for sliding movement between the designated positions, said barrier covering said operable member covering said operable member such that operation of said operable member is allowed only at a specified designated position; and a switch for generating a starting signal for a controlling circuit of said camera when said barrier passes a predetermined position between adjacent ones of the designated positions.

11. A camera, comprising:

an operable member operable for reflecting intention of a photographer on exposure;

a barrier mounted for movement between an open position in which said operable member is exposed to allow operation of said operable member and a closed position in which said barrier covers said operable member to prevent operation of said operable member; and a switch for producing a signal for starting a controlling operation of said camera when said barrier is moved to pass a predetermined position between the open position and the closed position.

12. A camera according to claim 11, wherein said camera includes a microcomputer for controlling the operation of said camera and having a starting terminal at which said microcomputer receives the starting signal from said switch.

13. A camera according to claim 12, wherein said microcomputer enables selection of a mode in which intention of a photographer is reflected on exposure by operation of said operable member when said barrier is in the open position, and when said barrier is in the closed position, said microcomputer selects another exposure controlling mode in which the intention of the photographer is not reflected on exposure and judges whether or not said barrier is in the closed position when said microcomputer is started by said switch.

* * * * *